United States Patent
Yanase

(10) Patent No.: US 9,210,781 B2
(45) Date of Patent: Dec. 8, 2015

(54) LIGHT SOURCE DEVICE AND PROJECTOR

(71) Applicant: SEIKO EPSON CORPORATION, Tokyo (JP)

(72) Inventor: Shigehiro Yanase, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/187,683

(22) Filed: Feb. 24, 2014

(65) Prior Publication Data

US 2014/0247432 A1   Sep. 4, 2014

(30) Foreign Application Priority Data

Mar. 4, 2013 (JP) ................................ 2013-041750

(51) Int. Cl.
  *H05B 37/03* (2006.01)
  *G03B 21/20* (2006.01)

(52) U.S. Cl.
  CPC ............ *H05B 37/036* (2013.01); *G03B 21/206* (2013.01); *G03B 21/2086* (2013.01); *Y02B 20/42* (2013.01)

(58) Field of Classification Search
  CPC .. H05B 37/02; H05B 33/089; H05B 33/0809; H05B 33/33083
  USPC ............. 315/289, 186, 122, 200 R, 307, 193, 315/291, 209 R, 312, 308, 224–226; 702/58
  See application file for complete search history.

(56) References Cited

U.S. PATENT DOCUMENTS

| 6,583,586 | B1 * | 6/2003 | Shih .............................. 315/291 |
| 2005/0077838 | A1 * | 4/2005 | Blumel ......................... 315/289 |
| 2009/0160349 | A1 * | 6/2009 | Weger ........................... 315/246 |
| 2010/0049454 | A1 * | 2/2010 | Irissou et al. ................... 702/58 |
| 2011/0068702 | A1 * | 3/2011 | van de Ven et al. ........... 315/186 |
| 2011/0199003 | A1 * | 8/2011 | Muguruma et al. .......... 315/122 |
| 2012/0056543 | A1 | 3/2012 | Yang et al. |
| 2012/0139448 | A1 * | 6/2012 | Chiang et al. ................. 315/307 |
| 2012/0229030 | A1 * | 9/2012 | Moskowitz et al. .......... 315/122 |
| 2013/0127354 | A1 * | 5/2013 | Chiang et al. ................. 315/193 |
| 2014/0159602 | A1 * | 6/2014 | Kato et al. ................ 315/200 R |

(Continued)

FOREIGN PATENT DOCUMENTS

| CN | 101707828 A | 5/2010 |
| CN | 202269055 U | 6/2012 |

(Continued)

*Primary Examiner* — Jimmy Vu
*Assistant Examiner* — Wei Chan
(74) *Attorney, Agent, or Firm* — Oliff PLC

(57) ABSTRACT

A light source device includes a plurality of light emitting devices connected in series, an open-circuit failure detecting section, a failure detection and maintenance section, and a short-circuiting section connected in parallel to at least one light emitting device among the plurality of light emitting devices. The open-circuit failure detecting section detects an open-circuit failure of the light emitting device connected in parallel. The failure detection and maintenance section shifts to, when the open-circuit failure detecting section detects the open-circuit failure, a circuit state during the open-circuit failure and maintains the circuit state to which the failure detection and maintenance section shifts. The short-circuiting section short-circuits, when the failure detection and maintenance section maintains the circuit state during the open-circuit failure, both ends of the light emitting device in which the open-circuit failure is detected.

8 Claims, 11 Drawing Sheets

(56) References Cited

U.S. PATENT DOCUMENTS

2014/0265899 A1* 9/2014 Sadwick .................. 315/200 R
2014/0327359 A1* 11/2014 Masazumi et al. ............ 315/122

FOREIGN PATENT DOCUMENTS

| | | |
|---|---|---|
| JP | A-2009-59835 | 3/2009 |
| JP | A-2011-222124 | 11/2011 |

* cited by examiner

LIGHT SOURCE DEVICE AND PROJECTOR

BACKGROUND

1. Technical Field

The present invention relates to a light source device and a projector.

2. Related Art

In a light source formed by a solid-state light source, a large number of light emitting devices are often connected to a power supply output in series and driven by current control. In this connection state, when one light emitting device fails in a state of opening between terminals, all normal light emitting devices connected in series cannot be driven. As measures against the problem, it is proposed to connect, in parallel to the light emitting devices, a Zener diode that operates at a voltage higher than a voltage across terminals during the driving of the individual light emitting devices (see, for example, JP-A-2011-222124 (Patent Literature 1) and JP-A-2009-59835 (Patent Literature 2)). In this case, when a light emitting device fails in an open mode, the Zener diode changes to an ON state to feed an electric current to the other series light emitting devices to thereby drive the solid-state light source.

When the Zener diode is used, heat radiation is necessary because the Zener diode generates heat. It is also conceivable to connect, instead of the Zener diode, in parallel to the light emitting devices, a self-on device such as a thyristor or a triac that starts operation at a voltage higher than the voltage across terminals during the driving of the individual light emitting devices. When the self-on device is used, heat generation is small compared with the Zener diode. However, the self-on device involves a sudden drop of the voltage across terminals during the operation. Therefore, a large rush current flows from a driving power supply side to a light emitting device. When the driving is stopped once, a short-circuit protection device returns to an OFF state. When the light emitting device is driven again, the short-circuit protection device changes to the ON state again and the rush current flows. The repetition of the rush current causes deterioration of the other normal light emitting devices. In particular, for example, when PWM driving is performed for dimming, since the rush current flows at every PWM driving pulse, the deterioration of the light emitting devices is serious.

SUMMARY

An advantage of some aspects of the invention is to provide a light source device and a projector that, even when an arbitrary light emitting device among a plurality of light emitting devices connected in series open-circuit fails, make it possible to reduce deterioration of the light emitting device while maintaining light emission of the other light emitting devices.

(1) An aspect of the invention is directed to a light source device including: a plurality of light emitting devices connected in series; and an open-circuit failure detecting section, a failure detection and maintenance section, and a short-circuiting section connected in parallel to at least one light emitting device among the plurality of light emitting devices. The open-circuit failure detecting section detects an open-circuit failure of the light emitting device connected in parallel. The failure detection and maintenance section shifts to, when the open-circuit failure detecting section detects the open-circuit failure, a circuit state during the open-circuit failure and maintains the circuit state to which the open-circuit failure detecting section shifts. The short-circuiting section short-circuits, when the failure detection and maintenance section maintains the circuit state during the open-circuit failure, both ends of the light emitting device in which the open-circuit failure is detected.

With this configuration, even when an arbitrary light emitting device among the plurality of light emitting devices connected in series open-circuit fails, it is possible to keep the open-circuit failed light emitting device short-circuited and maintain light emission of the other light emitting devices. Further, since both ends of the open-circuit failed light emitting device are kept short-circuited by maintaining the circuit state during the open-circuit failure, when driving of the light emitting device is started again, the driving begins in a state in which both the ends of the light emitting device are short-circuited. Therefore, since a rush current does not repeatedly flow to the light emitting device, it is possible to reduce deterioration of the light emitting device caused by the rush current.

(2) Another aspect of the invention is directed to the light source device described above, wherein the short-circuiting section includes an FET, a drain of which is connected to one end of the light emitting device and a source of which is connected to the other end of the light emitting device, and the short-circuiting section short-circuits both the ends of the light emitting device by changing the drain and the source of the FET to a conduction state.

With this configuration, the FET can short-circuit both the ends of the open-circuit failed light emitting device at nearly 0 ohm. Therefore, a loss in the FET decreases to nearly 0 W and heat generation can be reduced. As a result, when the circuit state during the open-circuit failure is maintained, there is an advantage that a heat radiation structure for the light source device is unnecessary.

(3) Still another aspect of the invention is directed to the light source device described above, wherein the failure detection and maintenance section includes a fuse that is fused when the opening-circuit failure detecting section detects the open-circuit failure, and the failure detection and maintenance section maintains the conduction state of the drain and the source of the FET when the fuse is fused.

With this configuration, by maintaining the conduction state of the drain and the source of the FET when the fuse is fused, it is possible to keep both the ends of the light emitting device short-circuited. Consequently, when the driving of the light emitting device is started again, the driving begins in a state in which both the ends of the light emitting device is short-circuited. Therefore, since a rush current does not repeatedly flow to the light emitting device, it is possible to reduce deterioration of the light emitting device caused by the rush current.

(4) Yet another aspect of the invention is directed to the light source device described above, wherein the short-circuiting section suppresses a change in gate potential of the FET until the fuse is fused.

With this configuration, irrespective of a voltage across both ends of the fuse, it is possible to set the FET in a fixed high gate voltage state and keep the FET in an OFF state. Therefore, since the FET stays in the OFF state until the fuse is completely fused, it is possible to supply a constant electric current to the fuse until the fuse is completely fused. As a result, it is possible to prevent time required for the fusing of the fuse from increasing.

(5) Still yet another aspect of the invention is directed to the light source device described above, wherein one end of the fuse is connected to a cathode of a light emitting device in the next stage or a stage subsequent to the next stage of a first light emitting device to which the failure detection and maintenance section including the fuse is connected in series or an anode of a light emitting device connected to the pre-stage or a stage preceding the pre-stage of the first light emitting device.

With this configuration, since it is possible to apply a sufficient voltage to both the ends of the fuse, it is possible to surely fuse the fuse.

(6) Further another aspect of the invention is directed to the light source device described above, wherein the failure detection and maintenance section includes a capacitor and a plurality of transistors, and when the open-circuit failure detecting section detects the open-circuit failure, the failure detection and maintenance section accumulates charges in the capacitor and fix a conduction state of the plurality of transistors to maintain the conduction state of the drain and the source of the FET.

With this configuration, by maintaining the conduction state of the drain and the source of the FET, it is possible to keep both the ends of the light emitting device short-circuited. Consequently, when the driving of the light emitting device is started again, the driving begins in a state in which both the ends of the light emitting device is short-circuited. Therefore, since a rush current does not repeatedly flow to the light emitting device, it is possible to reduce deterioration in the light emitting device caused by the rush current.

(7) Still further another aspect of the invention is directed to the light source device described above, wherein the open-circuit failure detecting section includes a Zener diode having a breakdown voltage higher than a voltage applied to both the ends of the light emitting device when the light emitting device is normally operating, and when a voltage equal to or higher than the breakdown voltage is applied to the Zener diode, the failure detection and maintenance section shifts to the circuit state during the open-circuit failure and maintain the circuit state to which failure detection and maintenance section shifts.

With this configuration, an electric current does not flow to the Zener diode when the light emitting device is normally operating. Therefore, the failure detection and maintenance section does not shift to the circuit state during the open-circuit failure. On the other hand, when the light emitting device open-circuit fails and a voltage equal to or higher than the breakdown voltage is applied to the Zener diode, the failure detection and maintenance section shifts to the circuit state during the open-circuit failure and maintains the circuit state to which the failure detection and maintenance section shifts. Consequently, it is possible to keep both the ends of the light emitting device short-circuited.

(8) Yet further another aspect of the invention is directed to a projector including: a plurality of light emitting devices connected in series; a modulating section configured to modulate light emitted from the light emitting device; and an open-circuit failure detecting section, a failure detection and maintenance section, and a short-circuiting section connected in parallel to at least one light emitting device among the plurality of light emitting devices. The open-circuit failure detecting section detects an open-circuit failure of the light emitting device connected in parallel. The failure detection and maintenance section shifts to, when the open-circuit failure detecting section detects the open-circuit failure, a circuit state during the open-circuit failure and maintains the circuit state to which the failure detection and maintenance section shifts. The short-circuiting section short-circuits, when the failure detection and maintenance section maintains the circuit state during the open-circuit failure, both ends of the light emitting device in which the open-circuit failure is detected.

With this configuration, even when an arbitrary light emitting device among the plurality of light emitting devices connected in series open-circuit fails, it is possible to keep the open-circuit failed light emitting device short-circuited and maintain light emission of the other light emitting devices. Further, since both ends of the open-circuit failed light emitting device are kept short-circuited by maintaining the circuit state during the open-circuit failure, when driving of the light emitting device is started again, the driving begins in a state in which both the ends of the light emitting device are short-circuited. Therefore, since a rush current does not repeatedly flow to the light emitting device, it is possible to reduce deterioration of the light emitting device caused by the rush current.

BRIEF DESCRIPTION OF THE DRAWINGS

The invention will be described with reference to the accompanying drawings, wherein like numbers reference like devices.

DESCRIPTION OF EXEMPLARY EMBODIMENTS

First Embodiment

Figure 1:
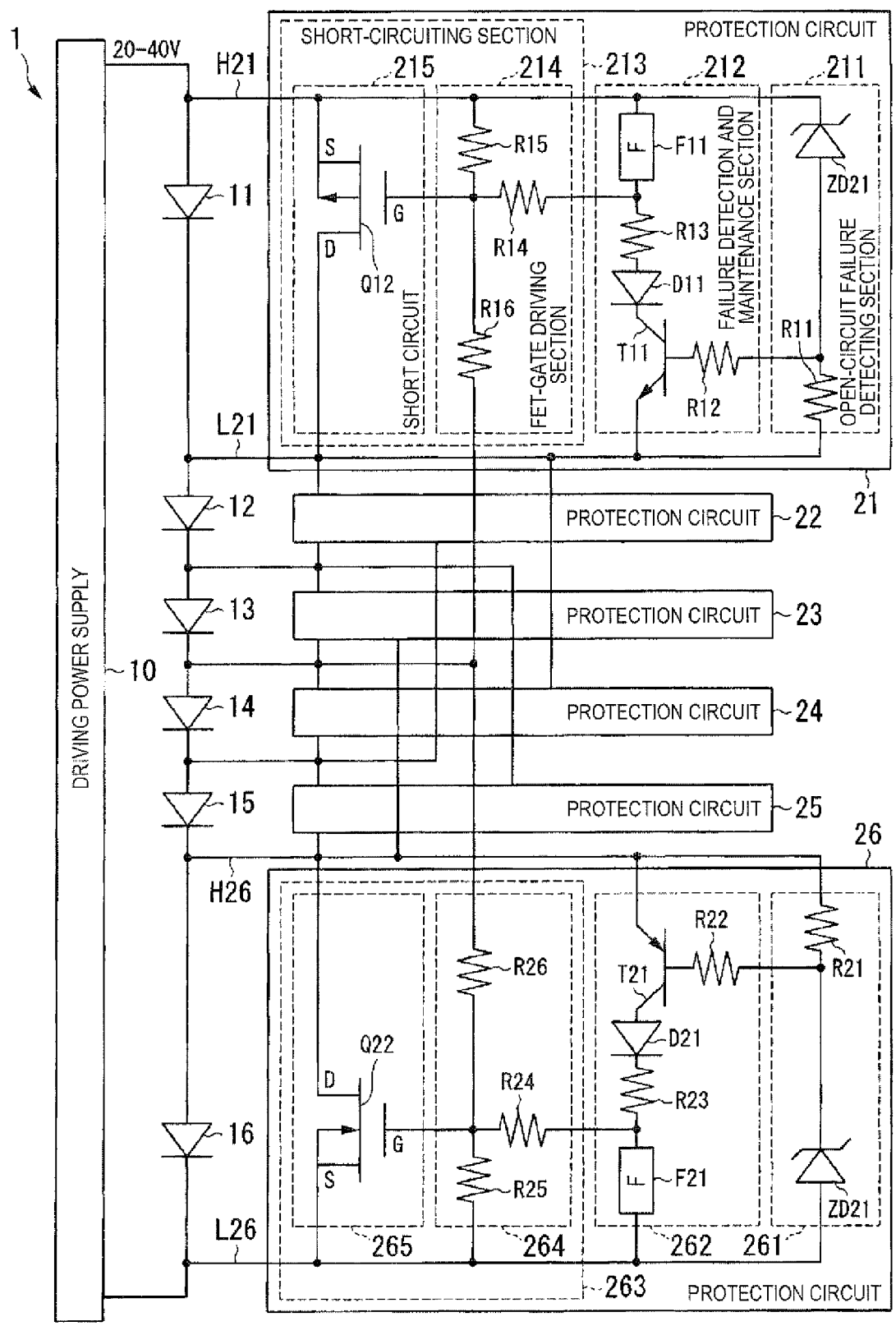
FIG. 1 is a schematic block diagram showing the configuration of a light source device in a first embodiment.

Embodiments of the invention are explained in detail below with reference to the drawings. FIG. 1 is a schematic block diagram showing the configuration of a light source device 1 in a first embodiment. The light source device 1 includes a driving power supply 10, six light emitting devices 11 to 16, and six protection circuits 21 to 26. The light emitting devices 11 to 16 are connected in series in order. The light emitting devices 11 to 16 are, for example, light emitting diodes. When a predetermined voltage (e.g., a voltage equal to or higher than 3.3 V and lower than 5.0 V) is applied to anodes of the light emitting devices 11 to 16, the light emitting devices 11 to 16 emit light. An anode of the light emitting device 11 is connected to the driving power supply 10 and a cathode of the light emitting device 11 is connected to an anode of the light emitting device 12. Similarly, the anode of the light emitting device 12 is connected to the cathode of the light emitting device 11 and a cathode of the light emitting device 12 is connected to an anode of the light emitting device 13. The anode of the light emitting device 13 is connected to the cathode of the light emitting device 12 and a cathode of the light emitting device 13 is connected to an anode of the light emitting device 14. The anode of the light emitting device 14 is connected to the cathode of the light emitting device 13 and a cathode of the light emitting device 14 is connected to an anode of the light emitting device 15. The anode of the light emitting device 15 is connected to the cathode of the light emitting device 14 and a cathode of the light emitting device 15 is connected to an anode of the light emitting device 16. The anode of the light emitting device 16 is connected to the cathode of the light emitting device 15 and a cathode of the light emitting device 16 is connected to the driving power supply 10. Note that the light emitting devices 11 to 16 may be laser diodes (LD).

The driving power supply 10 is, for example, a constant current source. The driving power supply 10 supplies a constant current to the anode of the light emitting device 11. Consequently, an electric current flows to the light emitting devices 11 to 16. The light emitting devices 11 to 16 emit light. A voltage across both ends of the driving power supply 10 is, for example, 20 to 40 V.

The protection circuit 21 is connected to the light emitting device 11 in parallel. Similarly, the protection circuit 22 is connected to the light emitting device 12 in parallel, the protection circuit 23 is connected to the light emitting device 13 in parallel, the protection circuit 24 is connected to the light emitting device 14 in parallel, the protection circuit 25 is connected to the light emitting device 15 in parallel, and the protection circuit 26 is connected to the light emitting device 16 in parallel.

The circuit configuration of the protection circuit 21 is explained. Note that, since the circuit configuration of the protection circuits 22 and 23 is the same as the circuit configuration of the protection circuit 21, detailed explanation of the circuit configuration is omitted. The protection circuit 21 includes an open-circuit failure detecting section 211, a failure detection and maintenance section 212, and a short-circuiting section 213. The open-circuit failure detecting section 211, the failure detection and maintenance section 212, and the short-circuiting section 213 are connected to the light emitting device 11 in parallel.

The open-circuit failure detecting section 211 detects an open-circuit failure of the light emitting device 11 connected in parallel. The open-circuit failure detecting section 211 includes a Zener diode ZD11 and a resistor R11.

A cathode of the Zener diode ZD11 is connected to a high-potential line H21 and an anode of the Zener diode ZD11 is connected to a base of an NPN transistor T11 via a resistor R12 and connected to a low-potential line L21 via the resistor R11. The high-potential line H21 is a wire connected to the anode of the light emitting device 11. The low-potential line L21 is a wire connected to the cathode of the light emitting device 11.

When the open-circuit failure detecting section 211 detects an open circuit failure, the failure detection and maintenance section 212 shifts to a circuit state during the open circuit failure and maintains the circuit state to which the failure detection and maintenance section 212 shifts. The failure detection and maintenance section 212 includes a fuse F11, a resistor R13, a diode D11, the NPN transistor T11, and the resistor R12. One electrode of the fuse F11 is connected to the high-potential line H21 and the other electrode of the fuse F11 is connected to an anode of the diode D11 via the resistor R13. The other electrode is further connected to a gate of a pMOS transistor Q12 via a resistor R14.

The anode of the diode D11 is connected to the fuse F11 via the resistor R13 and a cathode of the diode D11 is connected to a collector of the NPN transistor T11.

The collector of the NPN transistor T11 is connected to the cathode of the diode D11, a base of the NPN transistor T11 is connected to the high-potential line H21 via the resistor R12 and the Zener diode ZD11, and an emitter of the NPN transistor T11 is connected to the low-potential line L21.

When the failure detection and maintenance section 212 maintains the circuit state during the open-circuit failure, the short-circuiting section 213 short-circuits both ends of the light emitting device 11 in which the open-circuit failure is detected. The short-circuiting section 213 includes an FET-gate driving section 214 and a short circuit 215.

The FET-gate driving section 214 includes the resistor R14, a resistor R15, and a resistor R16. One end of the resistor R14 is connected to the fuse F11 and the resistor R13 and the other end of the resistor R14 is connected to the gate of the pMOS transistor Q12, the resistor R15, and the resistor R16. One end of the resistor R15 is connected to the high-potential line H21 and the other end of the resistor R15 is connected to the gate of the pMOS transistor Q12, the resistor R14, and the resistor R16. One end of the resistor R16 is connected to the resistor R14, the resistor R15, and the gate of the pMOS transistor Q12 and the other end of the resistor R16 is connected to the cathode of the light emitting device 13.

The short circuit 215 includes the pMOS (Metal-Oxide-Semiconductor) transistor Q12. The pMOS transistor Q12 is a p-channel type field effect transistor (FET). A source of the pMOS transistor Q12 is connected to the high-potential line H21. The gate of the pMOS transistor Q12 is connected to the anode of the light emitting device 11 and the source of the pMOS transistor Q12 via the resistor R15, connected to the fuse F11 via the resistor R14, and connected to the cathode of the light emitting device 13 via the resistor R16. A drain of the pMOS transistor Q12 is connected to the low-potential line L21. Note that, in this embodiment, as an example, the short circuit 215 includes the pMOS transistor Q12. However, the short circuit 215 may include another p-channel type FET instead of the pMOS transistor Q12.

The operation of the protection circuit 21 is explained. First, the operation of the protection circuit 21 performed when the light emitting device 11 is normally operating is explained. A Zener breakdown voltage of the Zener diode ZD11 exceeds a driving voltage of the light emitting device 11 and is, for example, 5.0 V. Therefore, when the light emitting device 11 is normally operating, since an electric current does not flow to the Zener diode ZD11, the NPN transistor T11 is in the OFF state. Since the fuse F11 is not fused, a voltage across both ends of the fuse F11 is about 0 V, gate potential of the pMOS transistor Q12 is close to source potential of the pMOS transistor Q12, and the pMOS transistor Q12 is in the OFF state.

The operation of the protection circuit 21 performed when the light emitting device 11 open-circuit fails (is disconnected) is explained. When the light emitting device 11 open-circuit fails, the driving power supply 10 is about to feed a constant current to the light emitting device 11 and a voltage across both ends of the Zener diode ZD11 rises. When the voltage across both ends of the Zener diode ZD11 is equal to or higher than the Zener breakdown voltage (e.g., 5.0 V), an electric current starts to flow from the cathode to the anode of the Zener diode ZD11. Therefore, base potential of the NPN transistor T11 changes to a high level and the NPN transistor T11 changes to an ON state. Consequently, an electric current is supplied from the driving power supply 10 to the fuse F11.

When a certain time elapses after the light emitting device 11 open-circuit fails (is disconnected), the fuse F11 is fused with heat generated by the flow of the electric current supplied from the driving power supply 10. When the fuse F11 is fused, the gate and the source of the pMOS transistor Q12 connected via the resistor R14 are disconnected. Therefore, a gate voltage of the pMOS transistor Q12 depends on the resistor R15 and the resistor R16. Since the gate of the pMOS transistor Q12 is connected to the cathode of the light emitting device 13 two stages below the protection circuit 21 via the resistor R16, when the fuse F11 is cut, the gate voltage of the pMOS transistor Q12 drops following the voltage of the cathode of the light emitting device 13 two stages below the protection circuit 21. Therefore, the gate voltage of the pMOS transistor Q12 changes to a low level and the pMOS transistor Q12 changes to the ON state. Resistance values of the resistor R15 and the resistor R16 are determined in advance such that the gate voltage of the pMOS transistor Q12 changes to the low level when the fuse F11 is cut in this way. When the pMOS transistor Q12 changes to the ON state, an electric current flows between the source and the drain of the pMOS transistor Q12 and both the ends of the light emitting device 11 can be short-circuited. Consequently, the pMOS transistor Q12 supplies an electric current flowing into the open-circuit failed light emitting device 11 to the light emitting device 12 bypassing the light emitting device 11. Therefore, the driving power supply 10 can drive the other light emitting devices 12 to 16 connected in series. Since connection of a circuit that supplies the gate voltage of the pMOS transistor Q12 is changed because the fuse F11 is fused, when the driving of the light emitting devices 12 to 16 is started again, the driving begins in the ON state of the pMOS transistor Q12. Therefore, since a rush current does not repeatedly flow, the protection circuit 21 can reduce deterioration of the light emitting devices 12 to 16 caused by the rush current.

In this embodiment, the gate voltage of the pMOS transistor Q12 needs to be set lower than a source voltage by 5 V or more. Therefore, in order to completely turn on the pMOS transistor Q12, the gate of the pMOS transistor Q12 is connected to the cathode of the light emitting device 13 two stages below the protection circuit 21 via the resistor R16. Consequently, the gate voltage of the pMOS transistor Q12 can be set lower than the source voltage in a range of, for example, 6.6 V to 10 V.

In this embodiment, as an example, the gate of the pMOS transistor Q12 is explained as being connected to the cathode of the light emitting device 13 two stages below the protection circuit 21. However, the gate of the pMOS transistor Q12 may be connected to a cathode of a light emitting device one stage or three or more stages below the protection circuit 21.

The circuit configuration of the protection circuit 26 is explained. Note that, since the circuit configuration of the protection circuits 24 and 25 is the same as the circuit configuration of the protection circuit 26, detailed explanation of the circuit configuration is omitted. The protection circuit 26 is different from the protection circuit 21 in that, in order to obtain gate potential for changing an FET to the ON state, the protection circuit 26 includes an n-channel FET rather than the p-channel FET and, in order to obtain an on-gate voltage for changing the n-channel FET to the ON state, a gate of the n-channel FET is connected to the anode of the light emitting device 14 two stages above the protection circuit 26. Since the protection circuit 26 includes the n-channel FET, the other components of the protection circuit 26 are different from the components of the protection circuit 21. Details of the circuit configuration of the protection circuit 26 are explained below.

The protection circuit 26 includes an open-circuit failure detecting section 261, a failure detection and maintenance section 262, and a short-circuiting section 263. The open-circuit failure detecting section 261, the failure detection and maintenance section 262, and the short-circuiting section 263 are connected to the light emitting device 16 in parallel.

The open-circuit failure detecting section 261 detects an open-circuit failure of the light emitting device 16 connected in parallel. The open-circuit failure detecting section 261 includes a Zener diode ZD21 and a resistor R21. An anode of the Zener diode ZD21 is connected to a low-potential line L26 and a cathode of the Zener diode ZD21 is connected to a high-potential line H26 via the resistor R21 and connected to a base of a PNP transistor T21 via a resistor R22. The high-potential line H26 is a wire connected to the anode of the light emitting device 16. The low-potential line L26 is a wire connected to the cathode of the light emitting device 16.

When the open-circuit failure detecting section 261 detects an open-circuit failure, the failure detection and maintenance section 262 shifts to a circuit state during the open-circuit failure and maintains the circuit state to which the failure detection and maintenance section 262 shifts. The failure detection and maintenance section 262 includes a fuse F21, a resistor R23, a diode D21, the PNP transistor T21, and the resistor R22. One electrode of the fuse F21 is connected to the low-potential line L26 and the other electrode of the fuse F21 is connected to a cathode of the diode D21 via the resistor R23. Further, the other electrode is connected to a gate of a p-channel FET (Q22) via a resistor R24.

The cathode of the diode D21 is connected to the fuse F21 via the resistor R13 and an anode of the diode D21 is connected to a collector of the PNP transistor T21.

The collector of the PNP transistor T21 is connected to the anode of the diode D21, a base of the PNP transistor T21 is connected to the cathode of the Zener diode ZD21 and the resistor R21 via the resistor R22, and an emitter of the PNP transistor T21 is connected to the high-potential line H26.

When the failure detection and maintenance section 262 maintains the circuit state during the open-circuit failure of the light emitting device 16, the short-circuiting section 263 short-circuits both ends of the light emitting device 16 in which the open-circuit failure is detected. The short-circuiting section 263 includes an FET-gate driving section 264 and a short circuit 265.

The FET-gate driving section 264 includes the resistor R24, a resistor R25, and a resistor R26. One end of the resistor R24 is connected to the fuse F21 and the resistor R23 and the other end of the resistor R24 is connected to the gate of the nMOS transistor Q22, the resistor R25, and the resistor R26. One end of the resistor R25 is connected to the low-potential line L26 and the other end of the resistor R25 is connected to the gate of the nMOS transistor Q22, the resistor R24, and the resistor R26. One end of the resistor R26 is connected to the resistor R24, the resistor R25, and the gate of the nMOS transistor Q22 and the other end of the resistor R26 is connected to the high-potential line H26.

The short circuit 265 includes the nMOS transistor Q22. The nMOS transistor Q22 is an n-channel type field effect transistor (FET). A source of the nMOS transistor Q22 is connected to the low-potential line L26. The gate of the nMOS transistor Q22 is connected to the cathode of the light emitting device 16 and the source of the nMOS transistor Q22 via the resistor R25, connected to the fuse F21 via the resistor R24, and connected to the cathode of the light emitting device 13 via the resistor R26. A drain of the nMOS transistor Q22 is connected to the high-potential line H26. Note that, in this embodiment, as an example, the short circuit 265 includes the nMOS transistor Q22. However, the short circuit 265 may include another n-channel type FET instead of the nMOS transistor Q22.

The operation of the protection circuit 26 is explained. First, the operation of the protection circuit 26 performed when the light emitting device 16 is normally operating is explained. A Zener breakdown voltage of the Zener diode ZD21 exceeds a driving voltage of the light emitting device 16 and is, for example, 5.0 V. Therefore, when the light emitting device 16 is normally operating, since an electric current does not flow to the Zener diode ZD21, the PNP transistor T21 is in the OFF state. Since the fuse F21 is not fused, a voltage across both ends of the fuse F21 is about 0 V, gate potential of the nMOS transistor Q22 is close to source potential of the nMOS transistor Q22, and the nMOS transistor Q22 is in the OFF state.

The operation of the protection circuit 26 performed when the light emitting device 16 open-circuit fails (is disconnected) is explained. When the light emitting device 16 open-circuit fails, the driving power supply 10 is about to feed a constant current to the light emitting device 16 and a voltage across both ends of the Zener diode ZD21 rises. When the voltage across both ends of the Zener diode ZD21 is equal to or higher than the Zener breakdown voltage (e.g., 5.6 V), an electric current starts to flow from the cathode to the anode of the Zener diode ZD21. At that point, a predetermined Zener breakdown voltage (e.g., 5.0 V) is applied to the Zener diode ZD21. Therefore, base potential of the PNP transistor T21 changes to the low level and the PNP transistor T21 changes to the ON state. Consequently, an electric current is supplied from the driving power supply 10 to the fuse F21.

When time elapses, the fuse F21 is fused with heat generated by the electric current supplied from the driving power supply 10. When the fuse F21 is fused, the gate and the source of the nMOS transistor Q22 connected via the resistor R24 are disconnected. Therefore, a gate voltage of the nMOS transistor Q22 depends on the resistor R25 and the resistor R26. Since the gate of the nMOS transistor Q22 is connected to the anode of the light emitting device 14 two stages above the protection circuit 26 via the resistor R26, when the fuse F21 is cut, the gate voltage of the nMOS transistor Q22 rises following the voltage of the anode of the light emitting device 14 two stages above the protection circuit 26. Therefore, the gate voltage of the nMOS transistor Q22 changes to the high level and the nMOS transistor Q22 changes to the ON state. Resistance values of the resistor R25 and the resistor R26 are determined in advance such that the gate voltage of the nMOS transistor Q22 changes to the high level when the fuse F21 is cut in this way. When the nMOS transistor Q22 changes to the ON state, an electric current flows between the source and the drain of the nMOS transistor Q22 and both the ends of the light emitting device 16 can be short-circuited. Consequently, the nMOS transistor Q22 supplies an electric current flowing into the open-circuit failed light emitting device 16 to the driving power supply 10 bypassing the light emitting device 16. Therefore, the driving power supply 10 can drive the other light emitting devices 11 to 15 connected in series. Since connection of a circuit that supplies the gate voltage of the nMOS transistor Q22 is changed because the fuse F21 is fused, when the driving of the light emitting devices 11 to 15 is started again, the driving begins in the ON state of the nMOS transistor Q22. Therefore, since a rush current does not repeatedly flow, the protection circuit 26 can reduce deterioration of the light emitting devices 11 to 15 caused by the rush current.

In this embodiment, the gate voltage of the nMOS transistor Q22 needs to be set higher than a source voltage by 5 V or more. Therefore, in order to completely turn on the nMOS transistor Q22, the gate of the nMOS transistor Q22 is connected to the anode of the light emitting device 14 two stages above the protection circuit 26 via the resistor R26. Consequently, the gate voltage of the nMOS transistor Q22 can be set higher than the source voltage in a range of, for example, 6.6 V to 10 V.

In this embodiment, as an example, the gate of the nMOS transistor Q22 is explained as being connected to the anode of the light emitting device 14 two stages above the protection circuit 26. However, the gate of the nMOS transistor Q22 may be connected to an anode of a light emitting device one stage or three or more stages above the protection circuit 26.

As explained above, when the light emitting device 11 open-circuit fails, the protection circuit 21 in the first embodiment can change the gate potential of the pMOS transistor Q12 to the low level because the fuse F11 is fused. Since the gate of the pMOS transistor Q12 is connected to the cathode of the light emitting device 13, the FET-gate driving section 214 can supply a sufficient on-gate voltage to the pMOS transistor Q12. Therefore, since the sufficient on-gate voltage is supplied to the pMOS transistor Q12, the pMOS transistor Q12 can short-circuit both the ends of the open-circuit failed light emitting device 11 at nearly 0 ohm. Consequently, a loss of the protection circuit 21 during a protecting operation also decreases to nearly 0 W and heat generation can be reduced. Similarly, a loss in the FETs included in the protection circuits 22 to 26 decreases to nearly 0 W and heat generation can be reduced.

In the system in the past described in Patent Literature 1, in the Zener diode, since a power loss larger than a power loss of the light emitting device during the normal operation occurs, heat is generated. Therefore, a structure for discharging the heat is necessary. Even if a self-on device is connected in parallel to the light emitting device instead of the Zener diode, since the self-on device continues the ON state while an electric current is flowing and a power loss occurs in the self-on device, although the power loss is small compared with the power loss of the Zener diode, heat is generated. On the other hand, in this embodiment, since the light emitting device is short-circuited by the FET, heat is hardly generated. Therefore, compared with the conventional system, there is an advantage that a heat radiation structure for the protection circuit is unnecessary. Similarly, there is an advantage that a heat radiation structure for the protection circuits 22 to 26 is unnecessary.

The rush current flows only at an instance when the fuse F11 is cut. However, because the connection of the circuit that supplies the gate voltage of the FET changes because the fuse F11 is fused, when the driving is started again, the driving begins in the ON state of the FET. Therefore, since the rush current does not repeatedly flow, the protection circuit 21 can reduce deterioration of the light emitting devices 11 to 16 caused by the rush current. Similarly, the protection circuits 22 to 26 can reduce deterioration of the light emitting devices 11 to 16 caused by the rush current.

Further, since a certain degree of energy is necessary for the fusing of the fuse F11, the fuse F11 is not cut by unexpected external impulse noise or the like input from the outside. Consequently, it is possible to prevent the protection circuits 21 to 26 from malfunctioning even if slight impulse noise is present.

Second Embodiment

A second embodiment is explained. In the first embodiment, when an electric current is fed to the fuse F11, a resistance value of the fuse 111 rises according to a temperature rise of the fuse F11. A voltage across both ends of the fuse rises according to the rise in the resistance value. Consequently, a gate voltage of the pMOS transistor Q12 drops and the pMOS transistor Q12 starts to change to the ON state. Therefore, an electric current flows between the source and the drain of the pMOS transistor Q12 and the electric current flowing to the fuse F11 decreases.

On the other hand, in the second embodiment, the fuse F11 is connected to the gate of the pMOS transistor Q12 via two transistors. Consequently, since the pMOS transistor Q12 is in the OFF state until the fuse F11 is completely fused, the electric current flowing to the fuse F11 does not decrease until the fuse F11 is completely fused. Therefore, it is possible to prevent time until the fuse F11 is fused from being increasing.

Figure 2:
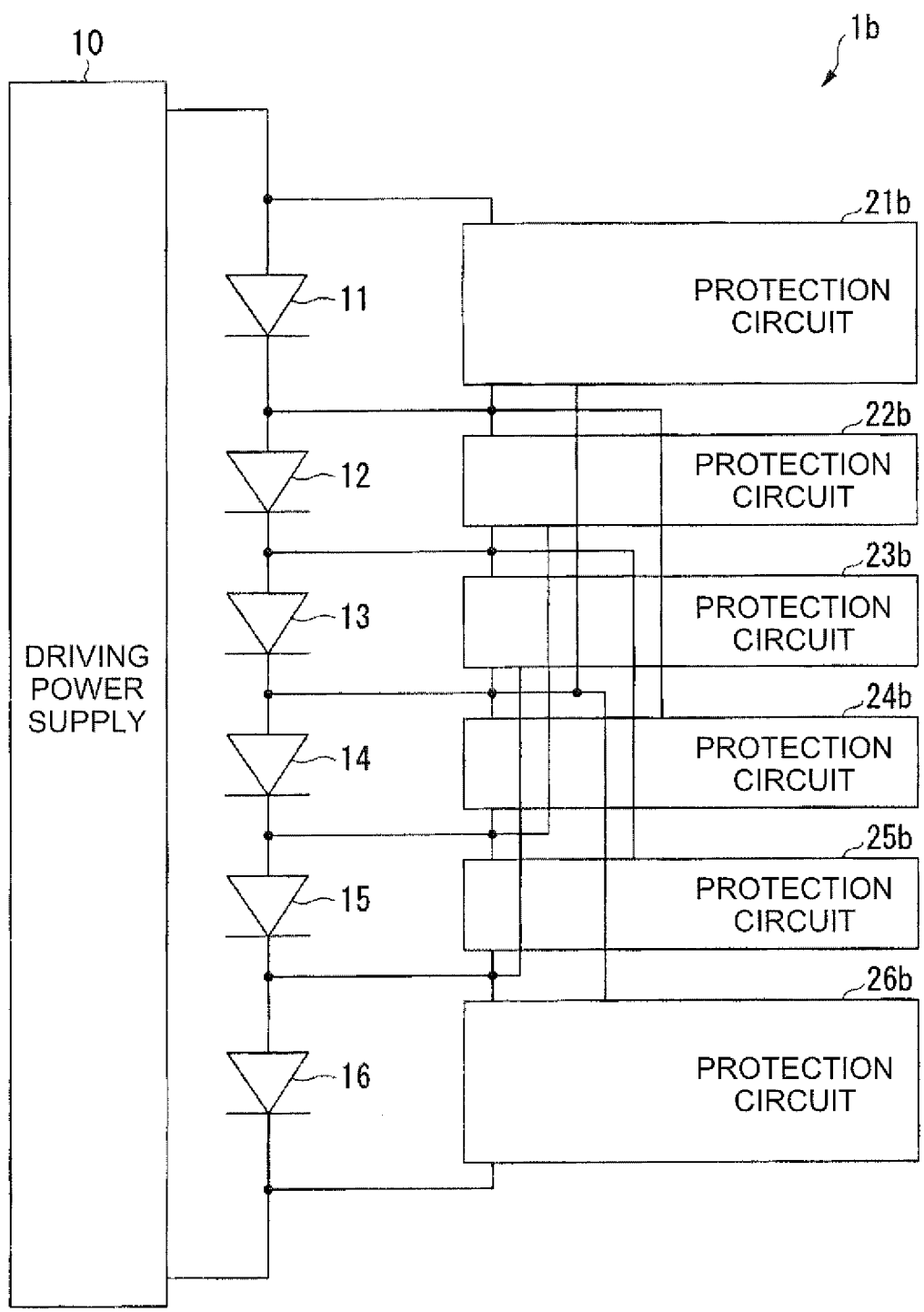
FIG. 2 is a schematic block diagram showing the configuration of a light source device in a second embodiment.

The configuration of a light source device 1b in the second embodiment is explained below. FIG. 2 is a schematic block diagram showing the configuration of the light source device 1b in the second embodiment. Note that components same as the components shown in FIG. 1 are denoted by the same reference numerals and signs and specific explanation of the components is omitted. The configuration of the light source device 1b in the second embodiment is changed from the configuration of the light source device 1 in the first embodiment in that the protection circuit 21 is changed to a protection circuit 21b, the protection circuit 22 is changed to a protection circuit 22b, the protection circuit 23 is changed to a protection circuit 23b, the protection circuit 24 is changed to a protection circuit 24b, the protection circuit 25 is changed to a protection circuit 25b, and the protection circuit 26 is changed to a protection circuit 26b.

Figure 3:
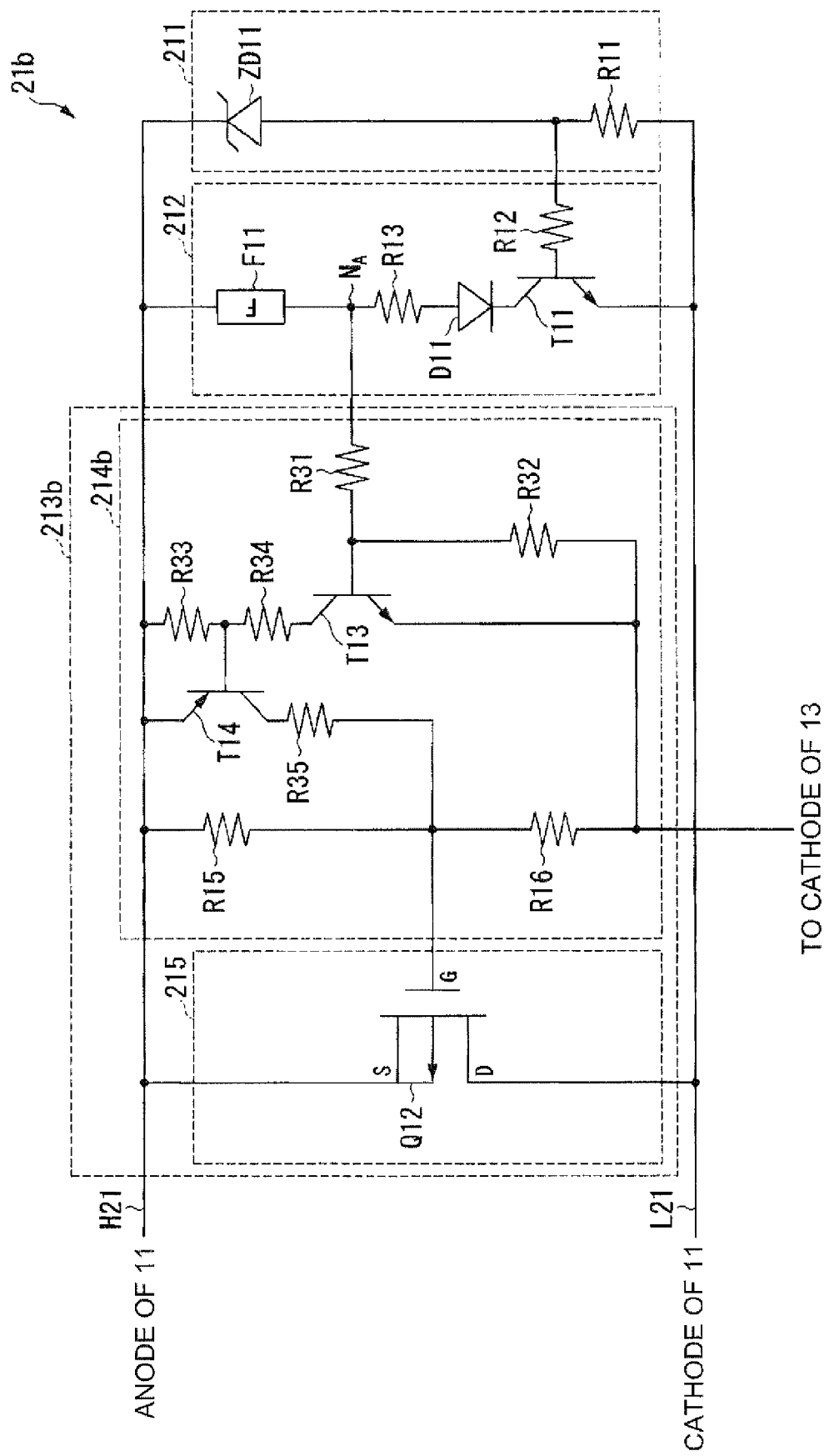
FIG. 3 is a circuit diagram of a protection circuit in a top stage in the second embodiment.

The circuit configuration of the protection circuit 21b is explained. Note that, since the circuit configuration of the protection circuits 22b and 23b is the same as the circuit configuration of the protection circuits 21b, detailed explanation of the circuit configuration is omitted. FIG. 3 is a circuit diagram of the protection circuit 21b in a top stage in the second embodiment. Note that components same as the components shown in FIG. 1 are denoted by the same reference numerals and signs and specific explanation of the components is omitted. The configuration of the protection circuit 21b in the second embodiment is changed from the configuration of the protection circuit 21 in the first embodiment in that the short-circuiting section 213 is changed to a short-circuiting section 213b and the FET-gate driving section 214 is changed to an FET-gate driving section 214b.

The FET-gate driving section 214b is a circuit that suppresses a change in gate potential of the pMOS transistor Q12 until the fuse F11 is fused. The FET-gate driving section 214b includes a resistor R31, a resistor R32, an NPN transistor T13, a resistor R33, a resistor R34, a PNP transistor T14, a resistor R35, the resistor R15, and the resistor R16.

A base of the NPN transistor T13 is connected to the fuse F11 and the resistor R13 via the resistor R31 and connected to the cathode of the light emitting device 13 via the resistor R32. A collector of the NPN transistor T13 is connected to the high-potential line H21 via the resistor R34 and the resistor R33. An emitter of the NPN transistor T13 is connected to the resistor R16 and the cathode of the light emitting device 13.

A base of the PNP transistor T14 is connected to the collector of the NPN transistor T13 via the resistor R34 and connected to the high-potential line H21 via the resistor R33. An emitter of the PNP transistor T14 is connected to the high-potential line H21. A collector of the PNP transistor T14 is connected to the gate of the pMOS transistor Q12, the resistor R15, and the resistor R16 via the resistor R35.

The operation of the protection circuit 21b is explained. First, the operation of the protection circuit 21b performed when the light emitting device 11 is normally operating is explained. The Zener breakdown voltage of the Zener diode ZD11 exceeds the driving voltage of the light emitting device 11 and is, for example, 5.0 V. Therefore, when the light emitting device 11 is normally operating, since base potential of the NPN transistor T11 is at the low level, the NPN transistor T11 is in the OFF state, and an electric current does not flow to the fuse F11, a base voltage of the NPN transistor T13 changes to the high level, and the NPN transistor T13 changes to the ON state. When the NPN transistor T13 changes to the ON state, base potential of the PNP transistor T14 changes to the low level, and the PNP transistor T14 changes to the ON state. Consequently, the gate potential of the pMOS transistor Q12 is close to the source potential of the pMOS transistor Q12. The p-channel FET Q12 is in the OFF state.

The operation of the protection circuit 21b performed when the light emitting device 11 open-circuit fails (is disconnected) is explained. When the light emitting device 11 open-circuit fails, the driving power supply 10 is about to feed a constant current to the light emitting device 11 and the voltage across both ends of the Zener diode ZD11 rises. When the voltage across both ends of the Zener diode ZD11 is equal to or higher than the Zener breakdown voltage (e.g., 5.0 V), an electric current starts to flow from the cathode to the anode of the Zener diode ZD11. Therefore, the base potential of the NPN transistor T11 changes to the high level and the NPN transistor T11 changes to the ON state. Consequently, an electric current is supplied from the driving power supply 10 to the fuse F11.

A connection point of the fuse F11 and the resistor R13 is referred to as node $N_A$. The resistor R32 has, for example, a large resistance value compared with a resistance value of the resistor R31. The resistance value of the resistor R31 is, for example, 4.7 kΩ and the resistance value of the resistor R32 is, for example 100 kΩ. Therefore, even if an electric current flows from the driving power supply 10 to the fuse F11 and the potential of the node $N_A$ slightly drops, the gate voltage of the NPN transistor T13 hardly changes and remains at the high level. As a result, the ON state of the NPN transistor T13 is maintained, the ON state of the PNP transistor T14 is maintained, and the OFF state of the pMOS transistor Q12 is maintained. Consequently, since the electric current flowing to the fuse F11 does not decrease until the fuse F11 is fused, it is possible to prevent the time required until the fuse F11 is fused from being increasing.

When a certain time elapses after the light emitting device 11 open-circuit fails (is disconnected), the fuse F11 is fused with heat generated by the electric current supplied from the driving power supply 10. When the fuse F11 is fused, since the node $N_A$ and the anode of the light emitting device 11 are disconnected, the potential of the node $N_A$ decreases. Consequently, the gate voltage of the NPN transistor T13 changes to the low level and the NPN transistor T13 changes to the OFF state.

When the NPN transistor T13 changes to the OFF state, the base potential of the PNP transistor T14 changes to the high level and the PNP transistor T14 changes to the OFF state. Consequently, the gate voltage of the pMOS transistor Q12 depends on the resistor R15 and the resistor R16. Since the gate of the pMOS transistor Q12 is connected to the cathode of the light emitting device 13 two stages below the protection circuit 21b via the resistor R16, when the fuse F11 is cut, the gate voltage of the pMOS transistor Q12 drops following the voltage of the cathode of the light emitting device 13 two stages below the protection circuit 21b. Therefore, the gate voltage of the pMOS transistor Q12 changes to the low level and the pMOS transistor Q12 changes to the ON state. Resistance values of the resistor R15 and the resistor R16 are determined in advance such that the gate voltage of the pMOS transistor Q12 changes to the low level when the fuse F11 is cut in this way.

When the pMOS transistor Q12 changes to the ON state, an electric current flows between the source and the drain of the pMOS transistor Q12. Both the ends of the light emitting device 11 can be short-circuited. Consequently, the pMOS transistor Q12 supplies an electric current flowing into the open-circuit failed light emitting device 11 to the light emitting device 12 bypassing the light emitting device 11. Therefore, the driving power supply 10 can drive the other light emitting devices 12 to 16 connected in series.

Figure 4:
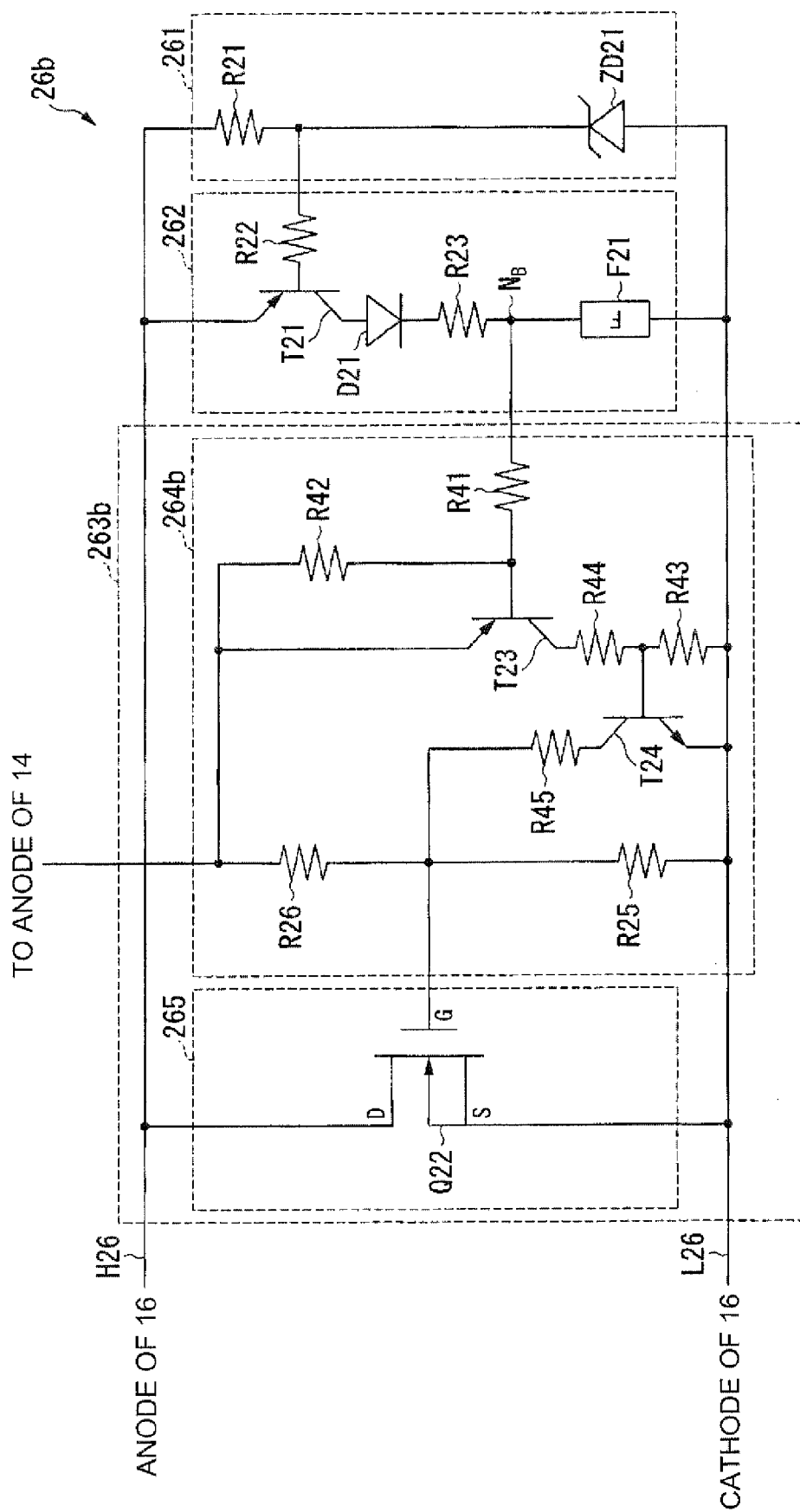
FIG. 4 is a circuit diagram of a protection circuit in a bottom stage in the second embodiment.

The circuit configuration of the protection circuit 26b is explained. Note that, since the circuit configuration of the protection circuits 24b and 25b is the same as the circuit configuration of the protection circuit 26b, detailed explanation of the circuit configuration is omitted. FIG. 4 is a circuit diagram of the protection circuit 26b in a bottom stage in the second embodiment. Note that components same as the components shown in FIG. 1 are denoted by the same reference numerals and signs and specific explanation of the components is omitted. The configuration of the protection circuit 26b in the second embodiment is changed from the configuration of the protection circuit 26 in the first embodiment in that the short-circuiting section 263 is changed to a short-circuiting section 263b and the FET-gate driving section 264 is changed to an FET-gate driving section 264b.

The FET-gate driving section 264b is a circuit that suppresses a change in the gate potential of the nMOS transistor Q22 until the fuse F21 is fused. The FET-gate driving section 264b includes a resistor R41, a resistor R42, a PNP transistor T23, a resistor R43, a resistor R44, an NPN transistor T24, a resistor R45, the resistor R25, and the resistor R26.

A base of the PNP transistor T23 is connected to the fuse F21 and the resistor R23 via the resistor R41 and connected to the cathode of the light emitting device 13 via the resistor R42. A collector of the PNP transistor T23 is connected to the low-potential line L26 via the resistor R44 and the resistor R43. An emitter of the PNP transistor T23 is connected to the resistor R26 and the cathode of the light emitting device 13.

A base of the NPN transistor T24 is connected to the collector of the PNP transistor T23 via the resistor R44 and connected to an emitter of the NPN transistor T24 via the resistor R43. The emitter of the NPN transistor T24 is connected to the low-potential line L26. A collector of the NPN transistor T24 is connected to the gate of the nMOS transistor Q22, the resistor R25, and the resistor R26 via the resistor R45.

The operation of the protection circuit 26b is explained. First, the operation of the protection circuit 26b performed when the light emitting device 16 is normally operating is explained. The Zener breakdown voltage of the Zener diode ZD21 exceeds the driving voltage of the light emitting device 16 and is, for example, 5.0 V. Therefore, when the light emitting device 16 is normally operating, since the PNP transistor T21 is in the OFF state and an electric current does not flow to the fuse F21, the gate voltage of the PNP transistor T23 changes to the low level and the PNP transistor T23 changes to the ON state. When the PNP transistor T23 changes to the ON state, the base potential of the NPN transistor T24 changes to the high level and the NPN transistor T24 changes to the ON state. Consequently, the gate potential of the nMOS transistor Q22 is close to the source potential of the nMOS transistor Q22. The nMOS transistor Q22 is in the OFF state.

The operation of the protection circuit 26b performed when the light emitting device 11 open-circuit fails (is disconnected) is explained. When the light emitting device 16 open-circuit fails, the driving power supply 10 is about to feed a constant current to the light emitting device 161 and the voltage across both ends of the Zener diode ZD21 rises. When the voltage across both ends of the Zener diode ZD21 is equal to or higher than the Zener breakdown voltage (e.g., 5.0 V), an electric current starts to flow from the cathode to the anode of the Zener diode ZD21. Since a fixed Zener breakdown voltage is applied to both the ends of the Zener diode ZD21, the base potential of the PNP transistor T21 changes to the low level and the PNP transistor T21 changes to the ON state. Consequently, an electric current is supplied from the driving power supply 10 to the fuse F21.

A connection point of the fuse F21 and the resistor R23 is referred to as node $N_B$. The resistor R42 has, for example, a large resistance value compared with a resistance value of the resistor R41. The resistance value of the resistor R41 is, for example, 4.7 kΩ and the resistance value of the resistor R42 is, for example 100 kΩ. Therefore, even if an electric current flows from the driving power supply 10 to the fuse F21 and the potential of the node $N_B$ slightly drops, the gate voltage of the PNP transistor T23 hardly changes and remains at the low level. As a result, the ON state of the PNP transistor T23 is maintained, the ON state of the NPN transistor T24 is maintained, and the OFF state of the nMOS transistor Q22 is maintained. Consequently, since the electric current flowing to the fuse F21 does not decrease until the fuse F21 is fused, it is possible to prevent the time required until the fuse F21 is fused from being increasing.

When a certain time elapses after the light emitting device 16 open-circuit fails (is disconnected), the fuse F21 is fused by the electric current supplied from the driving power supply 10. When the fuse F21 is fused, since the node $N_B$ and the cathode of the light emitting device 16 are disconnected, the potential of the node $N_B$ decreases. Consequently, the gate voltage of the PNP transistor T23 changes to the low level and the PNP transistor T23 changes to the OFF state.

When the PNP transistor T23 changes to the OFF state, the base potential of the NPN transistor T24 changes to the high level and the NPN transistor T24 changes to the OFF state. Consequently, the gate voltage of the n-channel FET (Q22) depends on the resistor R25 and the resistor R26. Since the gate of the nMOS transistor Q22 is connected to the anode of the light emitting device 14 two stages above the protection circuit 26b via the resistor R26, when the fuse F21 is cut, the gate voltage of the nMOS transistor Q22 rises following the voltage of the anode of the light emitting device 14 two stages above the protection circuit 26b. Therefore, the gate voltage of the nMOS transistor Q22 changes to the high level and the nMOS transistor Q22 changes to the ON state. Resistance values of the resistor R25 and the resistor R26 are determined in advance such that the gate voltage of the nMOS transistor Q22 changes to the low level when the fuse F21 is cut in this way.

When the nMOS transistor Q22 changes to the ON state, an electric current flows between the source and the drain of the nMOS transistor Q22. Both the ends of the light emitting device 16 can be short-circuited. Consequently, the nMOS transistor Q22 supplies an electric current flowing into the open-circuit failed light emitting device 16 to the driving power supply 10 bypassing the light emitting device 16.

Therefore, the driving power supply 10 can drive the other light emitting devices 11 to 15 connected in series.

As explained above, the light source device 1b in the second embodiment is different from the light source device 1 in the first embodiment in that the fuse F11 is connected to the gate of the pMOS transistor Q12 via the two transistors. Consequently, irrespective of the voltage across both ends of the fuse F11, the pMOS transistor Q12 remains in the OFF state because the gate voltage of the pMOS transistor Q12 is fixed in the high state. Since the pMOS transistor Q12 remains in the OFF state until the fuse F11 is completely fused, it is possible to supply a constant current to the fuse F11 until the fuse F11 is completely fused. As a result, in addition to the effect of the light source device 1 in the first embodiment, the protection circuit 21b can prevent time required for the fusing of the fuse F21 from increasing. Similarly, in addition to the effect of the light source device 1 in the first embodiment, the protection circuit 26b can prevent time required for the fusing of the fuse F21 from increasing.

Third Embodiment

A third embodiment is explained. In the first embodiment and the second embodiment, since the driving power supply 10 performs constant current control, a predetermined voltage (e.g., 5 V) can be applied to the fuse at most. On the other hand, in a protection circuit in the third embodiment, since a voltage applied to a fuse is set to a voltage (e.g., 15 V) three times as high as the voltage in the first embodiment, even if the resistance of the fuse rises and a voltage applied to both ends of the fuse rises to about 10 V at an instance when the fuse is cut, it is possible to still feed an electric current equal to or larger than a predetermined current (e.g. 2 A) to the fuse. Consequently, since a large current can be continuously fed even if the resistance of the fuse rises, it is possible to more surely fuse the fuse.

Figure 5:
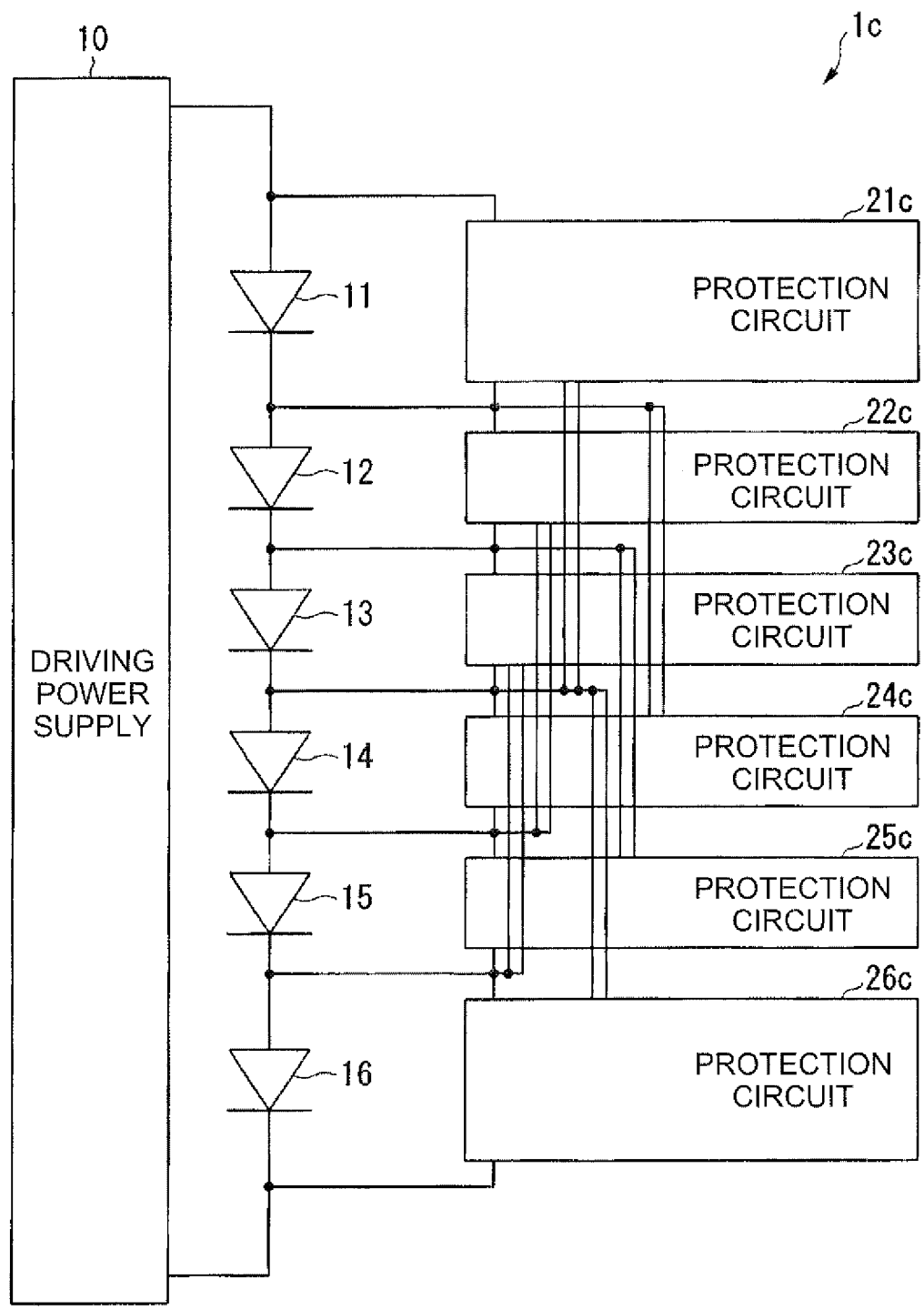
FIG. 5 is a schematic block diagram showing the configuration of a light source device in a third embodiment.

The configuration of a light source device 1c in the third embodiment is explained below. FIG. 5 is a schematic block diagram showing the configuration of the light source device 1c in the third embodiment. Note that components same as the components shown in FIG. 1 are denoted by the same reference numerals and signs and specific explanation of the components is omitted. The configuration of the light source device 1c in the third embodiment is changed from the configuration of the light source device 1 in the first embodiment in that the protection circuit 21 is changed to a protection circuit 21c, the protection circuit 22 is changed to a protection circuit 22c, the protection circuit 23 is changed to a protection circuit 23c, the protection circuit 24 is changed to a protection circuit 24c, the protection circuit 25 is changed to a protection circuit 25c, and the protection circuit 26 is changed to a protection circuit 26c.

Figure 6:
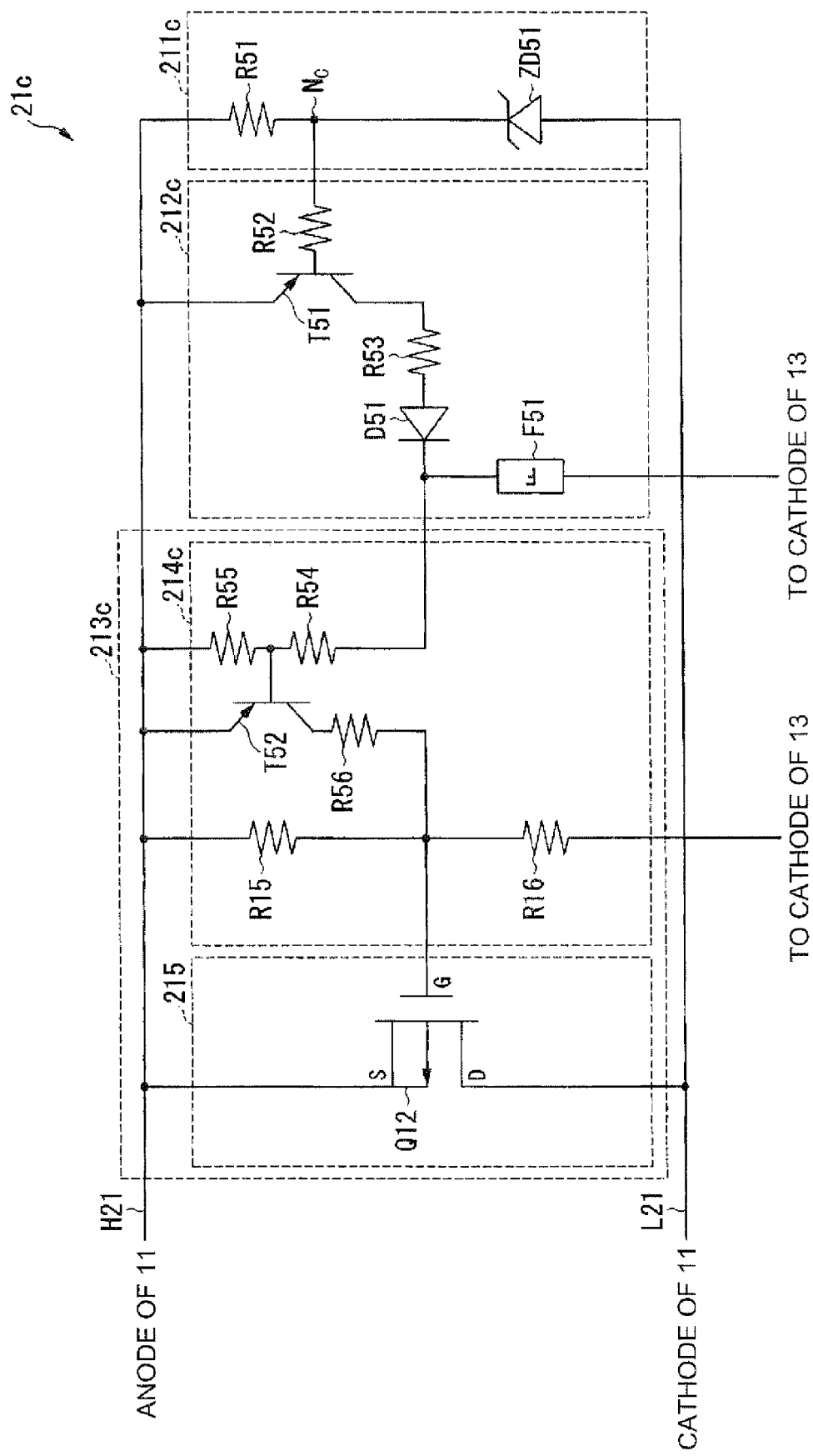
FIG. 6 is a circuit diagram of a protection circuit in a top stage in the third embodiment.

The circuit configuration of the protection circuit 21c is explained. Note that, since the circuit configuration of the protection circuits 22c and 23c is the same as the circuit configuration of the protection circuit 21c, detailed explanation of the circuit configuration is omitted. FIG. 6 is a circuit diagram of the protection circuit 21c in a top stage in the third embodiment. Note that components same as the components shown in FIG. 1 are denoted by the same reference numerals and signs and specific explanation of the components is omitted. The configuration of the protection circuit 21c in the third embodiment is changed from the configuration of the protection circuit 21 in the first embodiment in that the open-circuit failure detecting section 211 is changed to an open-circuit failure detecting section 211c, the failure detection and maintenance section 212 is changed to a failure detection and maintenance section 212c, the short-circuiting section 213 is changed to a short-circuiting section 213c, and the FET-gate driving section 214 is changed to an FET-gate driving section 214c.

The open-circuit failure detecting section 211c includes a Zener diode ZD51 and a resistor R51. An anode of the Zener diode ZD51 is connected to the low-potential line L21. A cathode of the Zener diode ZD51 is connected to the high-potential line H21 via the resistor R51 and connected to a base of a PNP transistor T51 via a resistor R52. A connection point of the cathode of the Zener diode ZD51 and the resistor R51 is referred to as node $N_C$.

The failure detection and maintenance section 212c includes the resistor R52, the PNP transistor T51, a resistor R53, a diode D51, and a fuse F51.

A base of the PNP transistor T51 is connected to the node $N_C$ via the resistor R52. An emitter of the PNP transistor T51 is connected to the high-potential line H21. A collector of the PNP transistor 151 is connected to an anode of the diode D51.

The anode of the diode D51 is connected to the collector of the PNP transistor T51 via the resistor R53. A cathode of the diode D51 is connected to the fuse F51 and connected to a base of a PNP transistor T52. An electrode at one end of the fuse F51 is connected to the cathode of the diode D51 and an electrode at the other end is connected to the cathode of the light emitting device 13.

The FET-gate driving section 214c includes a resistor R54, a resistor R55, the PNP transistor T52, a resistor R56, the resistor R15, and the resistor R16.

A base of the PNP transistor T52 is connected to one end of the fuse F51 and the cathode of the diode D51 via the resistor R54 and connected to the high-potential line H21 via the resistor R55. An emitter of the PNP transistor T52 is connected to the high-potential line H21. A collector of the PNP transistor T52 is connected to the gate of the pMOS transistor Q12, the resistor R15, and the resistor R16 via the resistor R56.

The operation of the protection circuit 21c is explained. First, the operation of the protection circuit 21c performed when the light emitting device 11 is normally operating is explained. A connection point of the Zener diode ZD51 and the resistor R51 is referred to as node $N_C$. A Zener breakdown voltage of the Zener diode ZD51 exceeds the driving voltage of the light emitting device 11 and is, for example, 5.0 V. Therefore, when the light emitting device 11 is normally operating, since an electric current does not flow to the Zener diode ZD51, the potential of the node $N_C$ is maintained in a high state. As a result, base potential of the PNP transistor T51 changes to the high level, the PNP transistor T51 is in the OFF state. Since the fuse F51 is not fused, resistance across both ends of the fuse F51 is about 0Ω and base potential of the PNP transistor T52 changes to the low level following the potential of the cathode of the light emitting device 13. As a result, since the PNP transistor T52 changes to the ON state, the gate potential of the pMOS transistor Q12 is close to the source potential of the pMOS transistor Q12 and the pMOS transistor Q12 is in the OFF state.

The operation of the protection circuit 21c performed when the light emitting device 11 open-circuit fails (is disconnected) is explained. When the light emitting device 11 open-circuit fails, the driving power supply 10 is about to feed a constant current to the light emitting device 11 and a voltage across both ends of the Zener diode ZD51 rises. When the voltage across both ends of the Zener diode ZD51 is equal to or higher than the Zener breakdown voltage (e.g., 5.6 V), an electric current starts to flow from the cathode to the anode of the Zener diode ZD51. At that point, a predetermined Zener breakdown voltage (e.g., 5.0 V) is applied to the Zener diode ZD51. Therefore, the base potential of the PNP transistor T51 changes to the low level and the PNP transistor T51 changes to the ON state. Consequently, an electric current is supplied from the driving power supply 10 to the fuse F51 via the PNP transistor T51 and the diode D51. Potential (e.g., 15 V) among maximum three light emitting devices is applied to the fuse F51. Therefore, even if the resistance of the fuse F51 rises because of heat, it is possible to feed a sufficient electric current (e.g., 2 A) to the fuse F51. Consequently, it is possible to surely fuse the fuse F51.

When time elapses, the fuse F51 is fused with the electric current supplied from the driving power supply 10. When the fuse F51 is fused, the base of the PNP transistor T52 and the cathode of the light emitting device 13 connected via the resistor R54 are disconnected. Therefore, a base voltage of the PNP transistor T52 changes to the high level and the PNP transistor T52 changes to the OFF state. Consequently, the gate voltage of the pMOS transistor Q12 depends on the resistor R15 and the resistor R16. Since the gate of the pMOS transistor Q12 is connected to the cathode of the light emitting device 13 two stages below the protection circuit 21c via the resistor R16, the gate voltage of the nMOS transistor Q22 drops following the voltage of the cathode of the light emitting device 13 two stages below the protection circuit 21c. Therefore, the gate voltage of the pMOS transistor Q12 changes to the low level and the pMOS transistor Q12 changes to the ON state. Resistance values of the resistor R15 and the resistor R16 are determined in advance such that the gate voltage of the pMOS transistor Q12 changes to the low level when the fuse F51 is cut in this way. When the pMOS transistor Q12 changes to the ON state, an electric current flows between the source and the drain of the pMOS transistor Q12 and both the ends of the light emitting device 11 can be short-circuited. Consequently, the pMOS transistor Q12 supplies an electric current flowing into the open-circuit failed light emitting device 11 to the light emitting device 12 bypassing the light emitting device 11. Therefore, the driving power supply 10 can drive the other light emitting devices 12 to 16 connected in series.

Note that, in this embodiment, as an example, the fuse F51 is explained as being connected to the cathode of the light emitting device 13 two stages below the protection circuit 21c. However, the fuse F51 may be connected to a cathode of a light emitting device one stage or three or more stages below the protection circuit 21c. In other words, one end of the fuse F51 may be connected to a cathode of a light emitting device in the next stage or a stage subsequent to the next stage of the light emitting device 11 to which the failure detection and maintenance section 212c including the fuse F51 is connected in parallel.

The circuit configuration of the protection circuit 26c is explained. Note that, since the circuit configuration of the protection circuits 24c and 25c is the same as the circuit configuration of the protection circuit 26c, detailed explanation of the circuit configuration is omitted. The protection circuit 26c is different from the protection circuit 21c in that, in order to obtain gate potential for changing an FET to the ON state, the protection circuit 26c includes an n-channel FET rather than the p-channel FET and, in order to obtain an on-gate voltage for changing the n-channel FET to the ON state, a gate of the n-channel FET is connected to the anode of the light emitting device 14 two stages above the protection circuit 26c. Further, in order to apply a large voltage to a fuse of the protection circuit 26c, one end of the fuse is connected to the anode of the light emitting device 14 two stages above the protection circuit 26c. Therefore, the other components of the protection circuit 26c are different from the components of the protection circuit 21c. Details of the circuit configuration of the protection circuit 26c are explained below.

Figure 7:
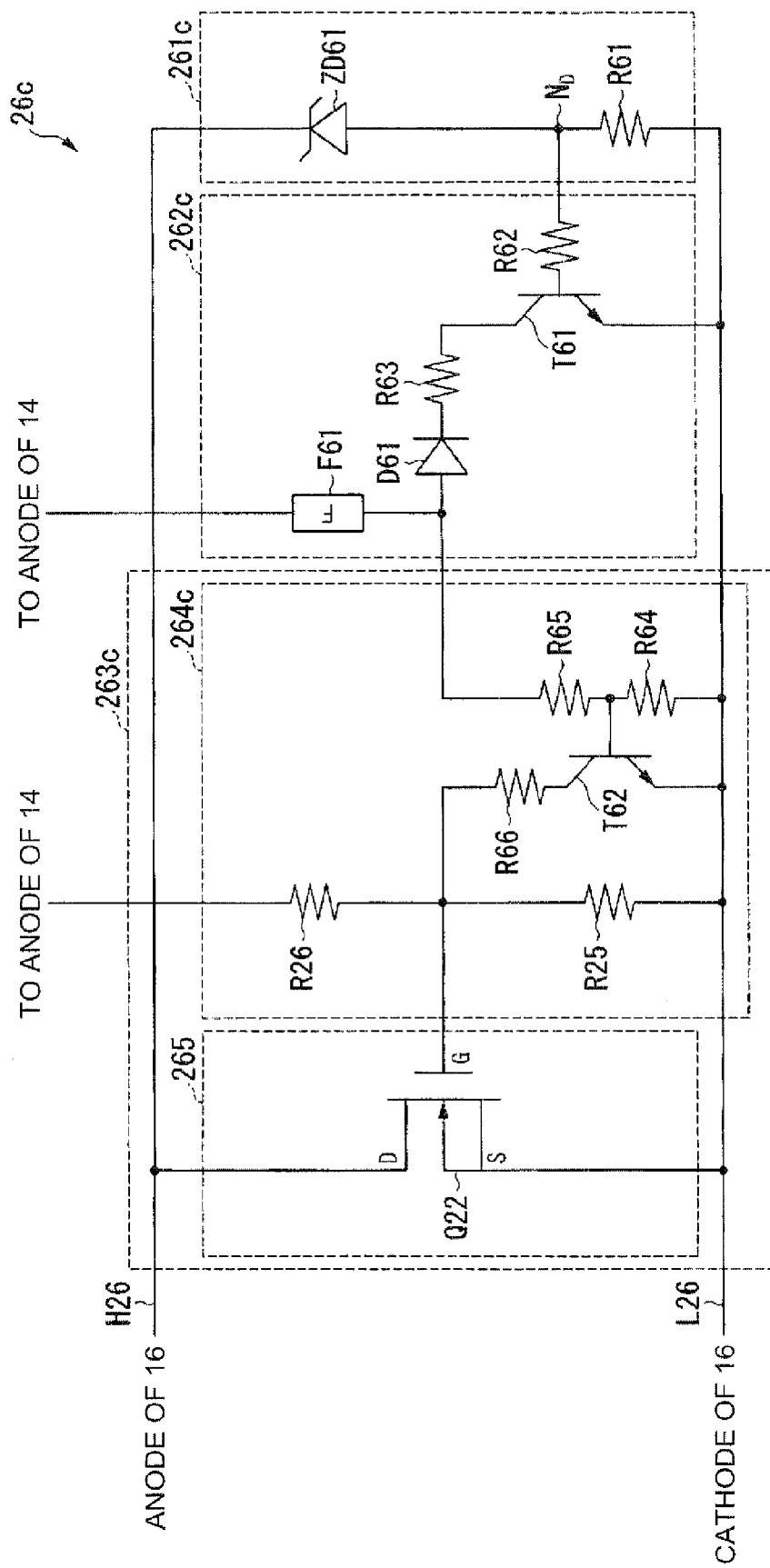
FIG. 7 is a circuit diagram of a protection circuit in a bottom stage in the third embodiment.

FIG. 7 is a circuit diagram of the protection circuit 26c in a bottom stage in the third embodiment. Note that components same as the components shown in FIG. 1 are denoted by the same reference numerals and signs and specific explanation of the components is omitted. The configuration of the protection circuit 26c in the third embodiment is changed from the configuration of the protection circuit 26 in the first embodiment in that the open-circuit failure detecting section 261 is changed to an open-circuit failure detecting section 261c, the failure detection and maintenance section 262 is changed to a failure detection and maintenance section 262c, the short-circuiting section 263 is changed to a short-circuiting section 263c, and the FET-gate driving section 264 is changed to an FET-gate driving section 264c.

The open-circuit failure detecting section 261c includes a Zener diode ZD61 and a resistor R61. An anode of the Zener diode ZD61 is connected to a base of an NPN transistor T61 and connected to the low-potential line L26 via the resistor R61. A cathode of the Zener diode ZD61 is connected to the high-potential line H26. A connection point of the Zener diode ZD61 and the resistor R61 is referred to as node $N_D$.

The failure detection and maintenance section 262c includes a resistor R62, the NPN transistor T61, a resistor R63, a diode D61, and a fuse F61.

A base of the NPN transistor T61 is connected to the node $N_D$ via the resistor R62. An collector of the NPN transistor T61 is connected to an anode of the diode D61 via the resistor R63. An emitter of the NPN transistor T61 is connected to the low-potential line L26.

The anode of the diode D61 is connected to the collector of the NPN transistor T61 via the resistor R63. A cathode of the diode D61 is connected to a base of an NPN transistor T62 via the fuse F61 and a resistor R65.

The FET-gate driving section 264c includes a resistor R64, the resistor R65, the NPN transistor T62, a resistor R66, the resistor R25, and the resistor R26.

The base of the NPN transistor T62 is connected to the cathode of the diode D61 and the fuse F61 via the resistor R65 and connected to the low-potential line L26 via the resistor R64. A collector of the NPN transistor T62 is connected to the gate of the nMOS transistor Q22, the resistor R25, and the resistor R26 via the resistor R66. An emitter of the NPN transistor T62 is connected to the low-potential line L26.

The operation of the protection circuit 26c is explained. First, the operation of the protection circuit 26c performed when the light emitting device 16 is normally operating is explained. A Zener breakdown voltage of the Zener diode ZD61 exceeds the driving voltage of the light emitting device 16 and is, for example, 5.0V. Therefore, when the light emitting device 16 is normally operating, since an electric current does not flow to the Zener diode ZD61, base potential of the NPN transistor T61 follows emitter potential of the NPN transistor T61. Therefore, the base potential of the NPN transistor T61 is at the low level and the NPN transistor T61 is in the OFF state. As a result, since an electric current does not flow to the fuse F61, the base potential of the NPN transistor T62 changes to the low level and the NPN transistor T62 changes to the ON state. When the NPN transistor T62 changes to the ON state, the gate potential of the nMOS transistor Q22 is close to the source potential of the nMOS transistor Q22 and the nMOS transistor Q22 is in the OFF state.

The operation of the protection circuit 26c performed when the light emitting device 16 open-circuit fails (is disconnected) is explained. When the light emitting device 16 open-circuit fails, the driving power supply 10 is about to feed a constant current to the light emitting device 16 and a voltage across both ends of the Zener diode ZD61 rises. When the voltage across both ends of the Zener diode ZD61 is equal to or higher than the Zener breakdown voltage (e.g., 5.0 V), an electric current starts to flow from the cathode to the anode of the Zener diode ZD61. The potential of the node $N_D$ rises because an electric current flows to the resistor R61. The base potential of the NPN transistor 161 changes to the high level. Therefore, the NPN transistor T61 changes to the ON state. Consequently, an electric current is supplied from the driving power supply 10 to the fuse F61. Potential (e.g., 15 V) among maximum three light emitting devices is applied to the fuse F61. Therefore, even if the resistance of the fuse F61 rises because of heat, it is possible to feed a sufficient electric current (e.g., 2 A) to the fuse F61. Consequently, it is possible to surely fuse the fuse F61.

When a certain time elapses after the light emitting device 16 open-circuit fails (is disconnected), the fuse F61 is burnt off and fused with heat generated by an electric current supplied from the driving power supply 10. When the fuse F61 is fused, base potential of the NPN transistor T62 changes to the low level and the NPN transistor T62 changes to the OFF state. Consequently, the gate voltage of the nMOS transistor Q22 depends on the resistor R25 and the resistor R26. The gate of the nMOS transistor Q22 is connected to the anode of the light emitting device 14 two stages above the protection circuit 26c via the resistor R26. Therefore, when the fuse F61 is cut, the gate voltage of the nMOS transistor Q22 rises following the voltage of the anode of the light emitting device 14 two stages above the protection circuit 26c. Therefore, the gate voltage of the nMOS transistor Q22 changes to the high level and the nMOS transistor Q22 changes to the ON state. Resistance values of the resistor R25 and the resistor R26 are determined in advance such that the gate voltage of the nMOS transistor Q22 changes to the high level when the fuse F61 is cut in this way.

When the nMOS transistor Q22 changes to the ON state, an electric current flows between the source and the drain of the nMOS transistor Q22. Both the ends of the light emitting device 16 can be short-circuited. Consequently, the nMOS transistor Q22 supplies an electric current flowing into the open-circuit failed light emitting device 16 to the driving power supply 10 bypassing the light emitting device 16. Therefore, the driving power supply 10 can drive the other light emitting devices 11 to 15 connected in series.

Note that, in this embodiment, as an example, the fuse F61 is explained as being connected to the anode of the light emitting device 14 two stages above the protection circuit 26c. However, the fuse F61 may be connected to an anode of a light emitting device one stage or three or more stages above the protection circuit 26c. In other words, one end of the fuse F61 may be connected to an anode of a light emitting device in the pre-stage or a stage preceding the pre-stage of the light emitting device 16 to which the failure detection and maintenance section 262c including the fuse F61 is connected in parallel.

As explained above, since potential (e.g., 15 V) among maximum three light emitting devices is applied to the fuses F51 and F61, even if the resistance of the fuses F51 and F61 rises and a voltage applied to both ends of the fuses F51 and F61 rises to about 10 V at an instance when the fuses F51 and F61 is cut, it is possible to feed a sufficient electric current to the fuses F51 and F61. Consequently, since a large current can be continuously fed to the fuses F51 and F61 even if the resistance of the fuses F51 and F61 rises, in addition to the effect in the first embodiment, it is possible to more surely fuse the fuses F51 and F61 than in the first embodiment.

Fourth Embodiment

Figure 8:
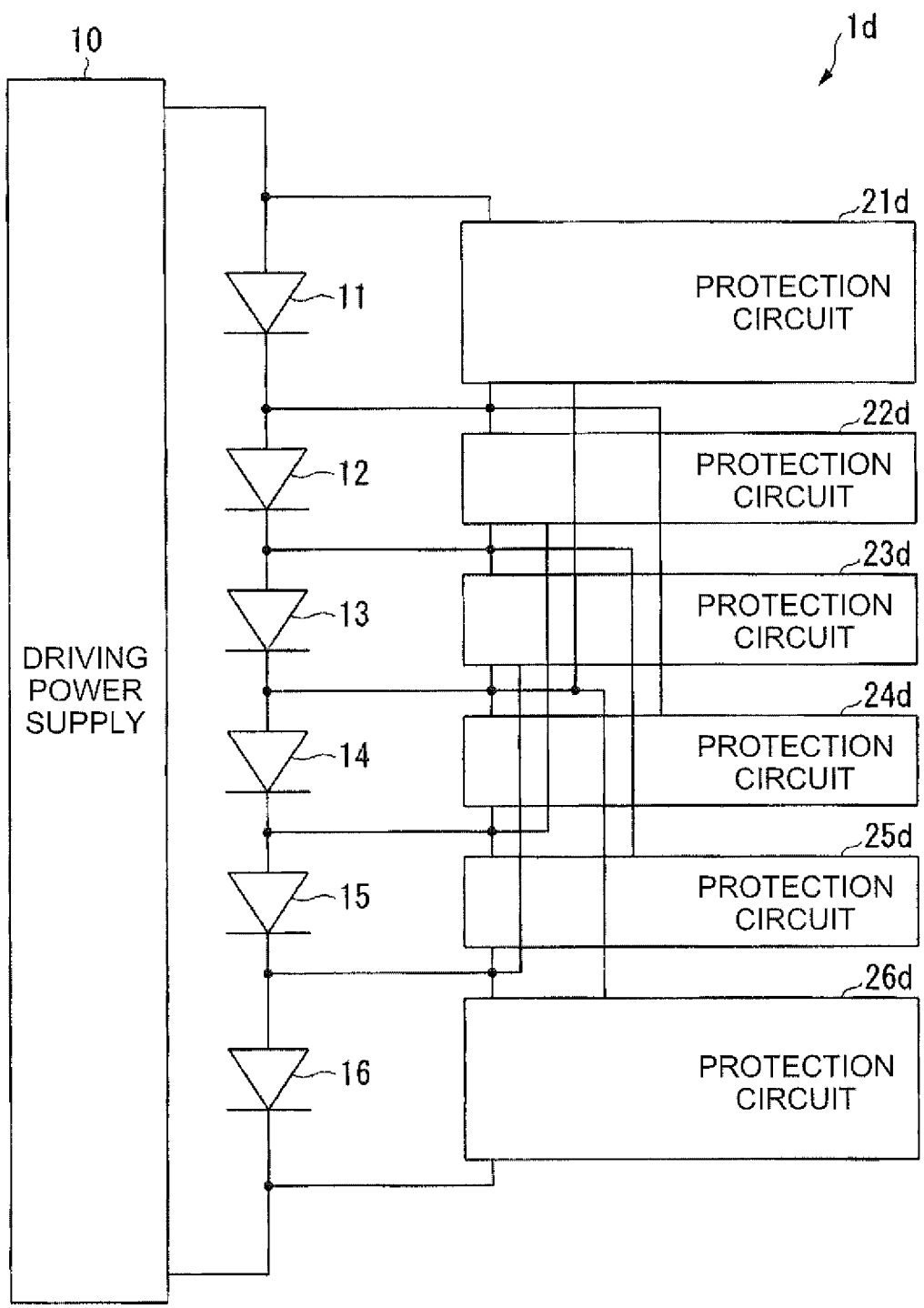
FIG. 8 is a schematic block diagram showing the configuration of a light source device in a fourth embodiment.

A fourth embodiment is explained. In a protection circuit in the fourth embodiment, a failure detection and maintenance section includes a latch circuit rather than a fuse. The configuration of a light source device 1d in the fourth embodiment is explained below. FIG. 8 is a schematic block diagram showing the configuration of the light source device 1d in the fourth embodiment. Note that components same as the components shown in FIG. 1 are denoted by the same reference numerals and signs and specific explanation of the components is omitted. The configuration of the light source device 1d in the fourth embodiment is changed from the configuration of the light source device 1 in the first embodiment in that the protection circuit 21 is changed to a protection circuit 21d, the protection circuit 22 is changed to a protection circuit 22d, the protection circuit 23 is changed to a protection circuit 23d, the protection circuit 24 is changed to a protection circuit 24d, the protection circuit 25 is changed to a protection circuit 25d, and the protection circuit 26 is changed to a protection circuit 26d.

Figure 9:
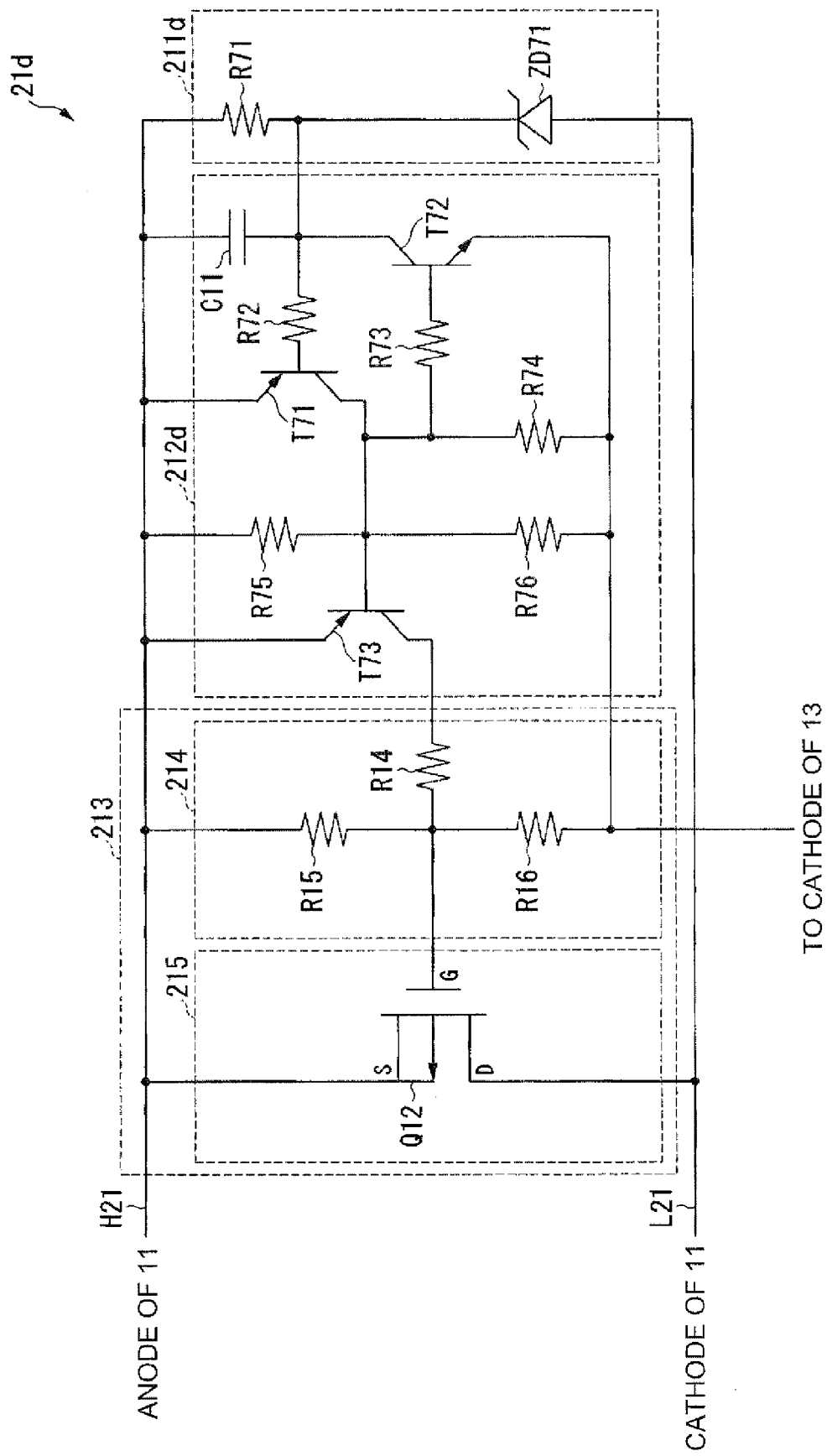
FIG. 9 is a circuit diagram of a protection circuit in a top stage in the fourth embodiment.

The circuit configuration of the protection circuit 21d is explained. Note that, since the circuit configuration of the protection circuits 22d and 23d is the same as the circuit configuration of the protection circuit 21d, detailed explanation of the circuit configuration is omitted. FIG. 9 is a circuit diagram of the protection circuit 21d at a top stage in the fourth embodiment. Note that components same as the components shown in FIG. 1 are denoted by the same reference numerals and signs and specific explanation of the components is omitted. The configuration of the protection circuit 21d in the fourth embodiment is changed from the configuration of the protection circuit 21 in the first embodiment in that the open-circuit failure detecting section 211 is changed to an open-circuit failure detecting section 211d and the failure detection and maintenance section 212 is changed to a failure detection and maintenance section 212d.

The open-circuit failure detecting section 211d includes a resistor R71 and a Zener diode ZD71. An anode of the Zener diode ZD71 is connected to the low-potential line L21 and a cathode of the Zener diode ZD71 is connected to the high-potential line H21 via the resistor R71, connected to a capacitor C11, connected to a base of a PNP transistor T71 via a resistor R72, and connected to a collector of an NPN transistor T72.

The failure detection and maintenance section 212d is a latch circuit that maintains, when the open-circuit failure detecting section 211d detects an open-circuit failure, a circuit state during the open-circuit failure. The failure detection and maintenance section 212d includes the capacitor C11, the resistor R72, the PNP transistor T71, a resistor R73, a resistor R74, the NPN transistor T72, a resistor R75, a resistor R76, and a PNP transistor T73.

An electrode at one end of the capacitor C11 is connected to the high-potential line H21 and an electrode at the other end of the capacitor C11 is connected to the base of the PNP transistor T71 and connected to the collector of the NPN transistor T72.

The base of the PNP transistor T71 is connected to the other end of the capacitor C11 and the collector of the NPN transistor T72 via the resistor R72. An emitter of the PNP transistor T71 is connected to the high-potential line H21. A collector of the PNP transistor T71 is connected to a base of the NPN transistor T72 via the resistor R73, connected to the cathode of the light emitting device 13 via the resistor R74 or the resistor R76, and connected to a base of the PNP transistor T73. Further, the collector of the PNP transistor T71 is connected to the high-potential line H21 via the resistor R75.

The base of the NPN transistor T72 is connected to the base of the PNP transistor T71 and the base of the PNP transistor T73 via the resistor R73, connected to the cathode of the light emitting device 13 via the resistor R73 and the resistor 74, and connected to the cathode of the light emitting device 13 via the resistor R73 and the resistor R76.

The base of the PNP transistor T73 is connected to the collector of the PNP transistor T71, connected to the cathode of the light emitting device 13 via the resistor R74 or the resistor R76, and connected to the high-potential line H21 via the resistor R75. An emitter of the PNP transistor T73 is connected to the high-potential line H21. A collector of the PNP transistor T73 is connected to the gate of the pMOS transistor Q12, the resistor R15, and the resistor R16 via the resistor R14.

The operation of the protection circuit 21d is explained. First, the operation of the protection circuit 21d performed when the light emitting device 11 is normally operating is explained. A Zener breakdown voltage of the Zener diode ZD71 exceeds the driving voltage of the light emitting device 11 and is, for example, 5.0V. Therefore, when the light emitting device 11 is normally operating, since an electric current does not flow to the Zener diode ZD71, base potential of the PNP transistor T71 is at the high level and the PNP transistor T71 is in the OFF state. In that case, base potential of the PNP transistor T73 depends on the resistor R75 and the resistor R76 and changes to the low level. Therefore, the PNP transistor T73 changes to the ON state. Consequently, the gate potential of the pMOS transistor Q12 is close to the source potential of the pMOS transistor Q12. The pMOS transistor Q12 changes to the OFF state.

The operation of the protection circuit 21d performed when the light emitting device 11 open-circuit fails (is disconnected) is explained. When the light emitting device 11 open-circuit fails, the driving power supply 10 is about to feed a constant current to the light emitting device 11 and a voltage across both ends of the Zener diode ZD71 rises. When the voltage across both ends of the Zener diode ZD71 is equal to or higher than the Zener breakdown voltage (e.g., 5.0 V), an electric current starts to flow from the cathode to the anode of the Zener diode ZD71. In that case, since the Zener breakdown voltage is applied to both ends of the Zener diode ZD71, the base potential of the PNP transistor T71 changes to the low level and the PNP transistor T71 changes to the ON state.

When the PNP transistor T71 changes to the ON state, since base potential of the NPN transistor T72 changes to the high level, the NPN transistor T72 changes to the ON state. Consequently, the potential of the base of the PNP transistor T71 follows the potential of the cathode of the light emitting device 13. Thereafter, the ON state of the PNP transistor T71 is maintained. The base of the PNP transistor T71 is connected to the capacitor C11 via the resistor R72, charges are accumulated in the capacitor C11, and the base potential of the PNP transistor T71 is maintained at the low level. Therefore, even when a power supply is interrupted for a short time because of PWM dimming or the like, the protection circuit 21d can maintain the ON state of the PNP transistor T71. At the same time, since the ON state of the PNP transistor T71 is maintained even if unexpected external noise is present, it is possible to prevent malfunction of the protection circuit 21d.

Since the ON state of the PNP transistor T71 is maintained, the potential of the base of the PNP transistor T73 is maintained at the high level and the PNP transistor T73 maintains the OFF state. Consequently, the gate potential of the pMOS transistor Q12 changes to the low level following the potential of the cathode of the light emitting device 13 and the pMOS transistor Q12 changes to the ON state. Consequently, the pMOS transistor Q12 supplies an electric current flowing into the open-circuit failed light emitting device 11 to the light emitting device 12 bypassing the light emitting device 11. Therefore, the driving power supply 10 can drive the other light emitting devices 12 to 16 connected in series.

Note that, in this embodiment, as an example, the gate of the pMOS transistor Q12 is explained as being connected to the cathode of the light emitting device 13 two stages below the protection circuit 21d. However, the gate of the pMOS transistor Q12 is not limited thereto and may be connected to a cathode of a light emitting device one stage or three or more stages below the protection circuit 21d.

Figure 10:
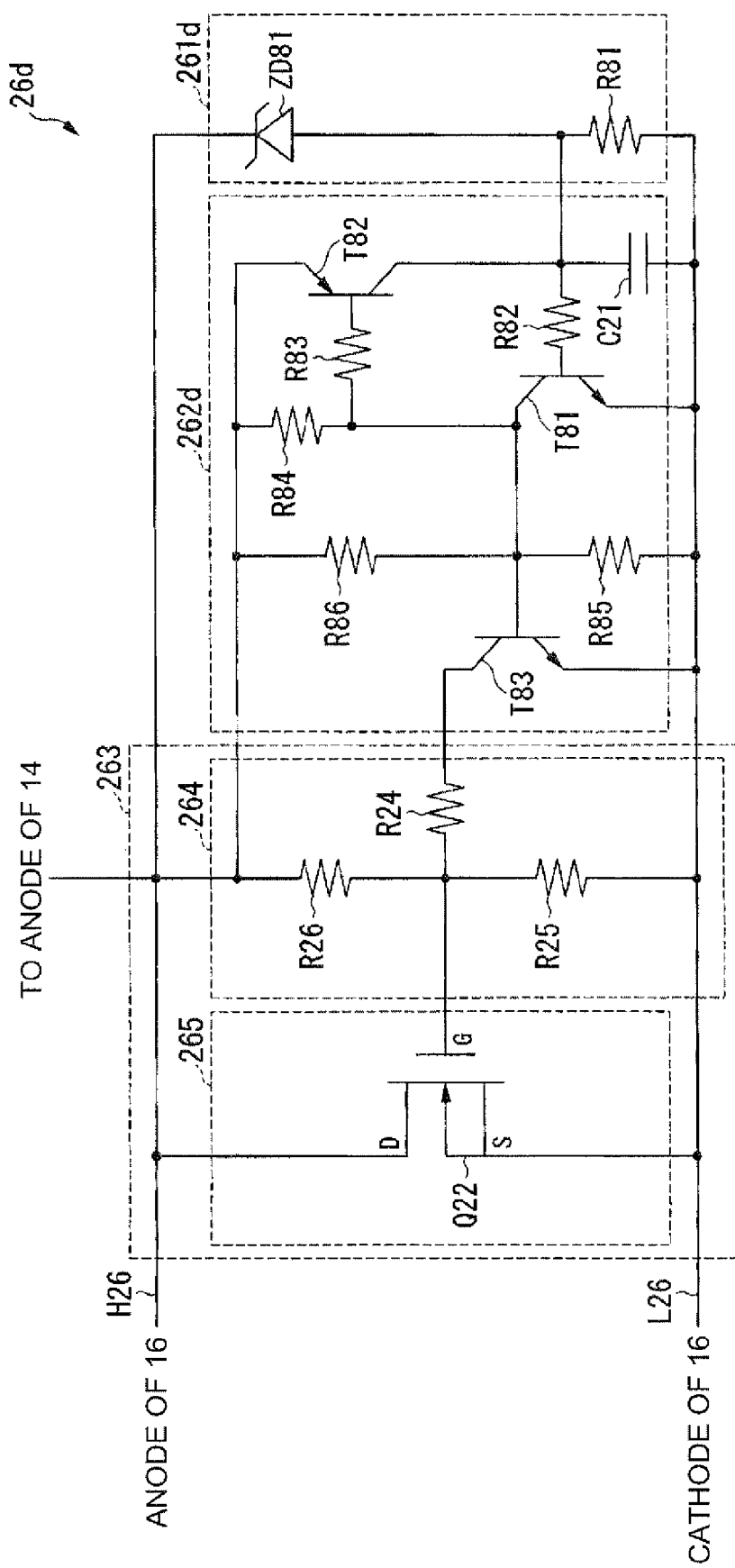
FIG. 10 is a circuit diagram of a protection circuit in a bottom stage in the fourth embodiment.

The circuit configuration of the protection circuit 26d is explained. Note that, since the circuit configuration of the protection circuits 24d and 25d is the same as the circuit configuration of the protection circuit 26d, detailed explanation of the circuit configuration is omitted. FIG. 10 is a circuit diagram of the protection circuit 26d in a bottom stage in the fourth embodiment. Note that components same as the components shown in FIG. 1 are denoted by the same reference numerals and signs and specific, explanation of the components is omitted. The configuration of the protection circuit 26d in the fourth embodiment is changed from the configuration of the protection circuit 26 in the first embodiment in that the open-circuit failure detecting section 261 is changed to an open-circuit failure detecting section 261d and the failure detection and maintenance section 262 is changed to a failure detection and maintenance section 262d.

The open-circuit failure detecting section 261d includes a resistor R81 and a Zener diode ZD81. An anode of the Zener diode ZD81 is connected to a collector of a PNP transistor T82 and an electrode at one end of a capacitor C21 and connected to a base of a NPN transistor T81 via a resistor R82. A cathode of the Zener diode ZD81 is connected to the high-potential line H26.

The failure detection and maintenance section 262d is a latch circuit that shifts to, when the open-circuit failure detecting section 261d detects an open-circuit failure, a circuit state during the open-circuit failure and maintains the circuit state to which the latch circuit shifts. The failure detection and maintenance section 262d includes the capacitor C21, the resistor R82, the NPN transistor T81, a resistor R83, a resistor R84, the PNP transistor T82, a resistor R85, a resistor R86, and an NPN transistor T83.

The electrode at one end of the capacitor C21 is connected to the base of the NPN transistor T81 via the resistor R82 and connected to the collector of the PNP transistor T82. An electrode at the other end of the capacitor C21 is connected to the low potential line L26.

The base of the NPN transistor T81 is connected to one end of the capacitor C21 and the collector of the PNP transistor T82 via the resistor R82. An emitter of the NPN transistor T81 is connected to the low-potential line L26. A collector of the NPN transistor T81 is connected to a base of the PNP transistor T82 via the resistor R83, connected to the cathode of the light emitting device 13 via the resistor R84 or the resistor R86, connected to a base of the NPN transistor 183, and connected to the low-potential line L26 via the resistor R85.

The base of the PNP transistor T82 is connected to the base of the NPN transistor T81 via the resistor R83, connected to the base of the NPN transistor T83, connected to the cathode of the light emitting device 13 via the resistor R83 and the resistor R84, and connected to the cathode of the light emitting device 13 via the resistor R83 and the resistor R86.

The base of the NPN transistor T83 is connected to the collector of the NPN transistor T81, connected to the anode of the light emitting device 14 via the resistor R84 or the resistor R86, and connected to the low-potential line L26 via the resistor R85. An emitter of the NPN transistor T83 is connected to the low-potential line L26. A collector of the NPN transistor T83 is connected to the gate of the nMOS transistor Q22, the resistor R25, and the resistor R26 via the resistor R24.

The operation of the protection circuit 26d is explained. First, the operation of the protection circuit 26d performed when the light emitting device 16 is normally operating is explained. A Zener breakdown voltage of the Zener diode ZD81 exceeds the driving voltage of the light emitting device 16 and is, for example, 5.0 V. Therefore, when the light emitting device 16 is normally operating, since an electric current does not flow to the Zener diode ZD81, base potential of the NPN transistor T81 follows emitter potential of the NPN transistor T81. Therefore, the base potential of the NPN transistor T81 changes to the low level and the NPN transistor T81 is in the OFF state. In that case, since base potential of the NPN transistor T83 changes to the high level, the NPN transistor T83 changes to the ON state. Resistance values of the resistor R85 and the resistor R86 are determined such that the base potential of the NPN transistor T83 changes to the high level when the NPN transistor T81 is in the OFF state. Consequently, the gate potential of the nMOS transistor Q22 is close to the source potential of the nMOS transistor Q22. The nMOS transistor Q22 changes to the OFF state.

The operation of the protection circuit 26d performed when the light emitting device 16 open-circuit fails (is disconnected) is explained. When the light emitting device 16 open-circuit fails, the driving power supply 10 is about to feed a constant current to the light emitting device 16 and a voltage across both ends of the Zener diode ZD81 rises. When the voltage across both ends of the Zener diode ZD81 is equal to or higher than the Zener breakdown voltage (e.g., 5.0 V), an electric current starts to flow from the cathode to the anode of the Zener diode ZD81. In that case, since the Zener breakdown voltage is applied to both ends of the Zener diode ZD81, the base potential of the NPN transistor T81 changes to the high level and the NPN transistor T81 changes to the ON state.

When the NPN transistor T81 changes to the ON state, since base potential of the PNP transistor T82 changes to the low level following the potential of the low-potential line L26, the PNP transistor T82 changes to the ON state. Consequently, the potential of the base of the NPN transistor T81 follows the potential of the anode of the light emitting device 14. Thereafter, the ON state of the NON transistor T81 is maintained. The base of the NON transistor T81 is connected to the capacitor C21 via the resistor R82, charges are accumulated in the capacitor C21, and the base potential of the NPN transistor T81 is maintained at the high level. Therefore, even when a power supply is interrupted for a short time because of PWM dimming or the like, the protection circuit 26d can maintain the ON state of the NPN transistor T81. At the same time, since the ON state of the NON transistor T81 is maintained even if unexpected external noise is present, it is possible to prevent malfunction of the protection circuit 26d.

Since the ON state of the NON transistor T81 is maintained, the potential of the base of the NON transistor T83 is maintained at the low level and the NON transistor T83 maintains the OFF state. Consequently, the gate potential of the nMOS transistor Q22 changes to the high level following the potential of the anode of the light emitting device 14 and the nMOS transistor Q22 changes to the ON state. Consequently, the nMOS transistor Q22 supplies an electric current flowing into the open-circuit failed light emitting device 16 to the driving power supply 10 bypassing the light emitting device 16. Therefore, the driving power supply 10 can drive the other light emitting devices 11 to 15 connected in series.

Note that, in this embodiment, as an example, the gate of the nMOS transistor Q22 is explained as being connected to the anode of the light emitting device 14 two stages above the protection circuit 26d. However, the gate of the nMOS transistor Q22 may be connected to an anode of a light emitting device one stage or three or more stages above the protection circuit 26d.

As explained above, in the fourth embodiment, the failure detection and maintenance section 212d includes the capacitor C11 and the plurality of transistors. When the open-circuit failure detecting section 211d detects an open-circuit failure, the failure detection and maintenance section 212d accumulates charges in the capacitor C11 and fixes a conduction state of the plurality of transistors to fix the p-channel PET (Q12) in the ON state. Consequently, it is possible to short-circuit both ends of an open-circuit failed light emitting device at nearly 0 ohm. As a result, a loss in the protection circuits during a protection operation decreases to nearly 0 W. Compared with the system in the past, there is an advantage that a heat radiation structure for the protection circuit 21d is unnecessary. Similarly, there is an advantage that a heat radiation structure for the protection circuits 22d to 26d is unnecessary.

When the open-circuit failure detecting section 211d detects an open-circuit failure of a light emitting device once, the ON state of the PNP transistor T71 included in the failure detection and maintenance section 212d is maintained and the resistor R14 and the high-potential line H21 are always disconnected. Consequently, the gate of the p-channel FET (Q12) is always at the low level and the ON state of the p-channel FET (Q12) is maintained. As a result, when driving is started again, the driving begins in the ON state of the p-channel FET (Q12). Therefore, since a rush current does not repeatedly flow, the protection circuit 21d can reduce deterioration of the light emitting device caused by the rush current. Similarly, the protection circuits 22d to 26d can reduce deterioration of the light emitting devices caused by the rush current.

Further, since the base of the PNP transistor T71 is connected to the capacitor C11 via the resistor R72 and charges are accumulated in the capacitor C11, the base potential of the PNP transistor T71 is maintained at the low level. Therefore, even when a power supply is interrupted for a short time because of PWM dimming or the like, the protection circuit 21d can maintain the ON state of the PNP transistor T71. At the same time, since the ON state of the PNP transistor T71 is maintained even if unexpected external noise is present, it is possible to prevent malfunction of the protection circuit 21d. Similarly, the protection circuits 22d to 26d can maintain the ON state of the NPN transistor T81. At the same time, since the ON state of the NPN transistor T81 is maintained even if unexpected external noise is present, it is possible to prevent malfunction of the protection circuits 22d to 26d.

Figure 11:
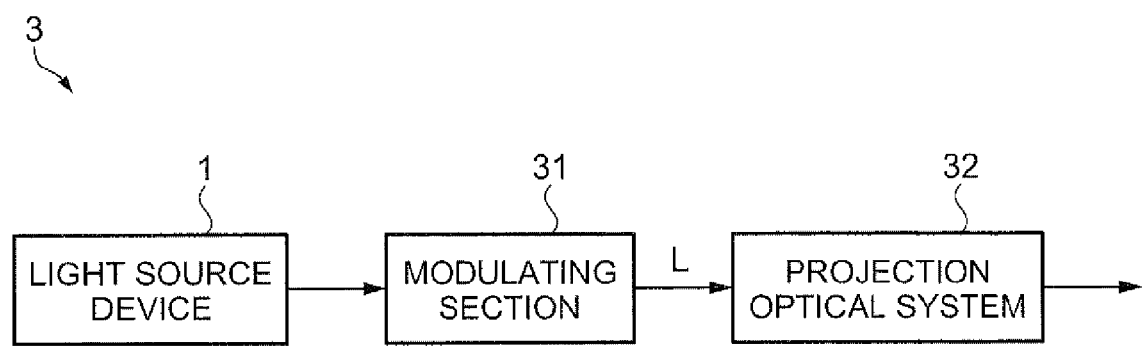
FIG. 11 is a schematic block diagram showing the configuration of a projector.

A projector may include any one of the light source devices in the embodiments. FIG. 11 is a schematic block diagram showing the configuration of a projector 3. For example, the projector 3 may generally include, as shown in FIG. 11, the light source device 1, a modulation section 31 configured to modulate, according to image data, light emitted from the light emitting devices 11 to 16 of the light source device 1 and form modulated image light L, and a projection optical system 32 configured to project the image light L on a not-shown screen. Note that, in the example shown in FIG. 11, the projector 3 includes the light source device 1. However, the projector 3 may include the light source devices 1b to 1d in the other embodiments instead of the light source device 1.

In the embodiments, the configuration in which the six light emitting devices are connected in series is explained. However, two to five or seven or more light emitting devices may be connected in series. That is, a plurality of light emitting devices only have to be connected in series.

In the embodiments, in each of the light emitting devices, the protection circuits are connected in parallel. However, the configuration is not limited thereto, and the protection circuits only have to be connected in parallel to at least one light emitting device among the light emitting devices. In other words, the light source device only has to include the open-circuit failure detecting section, the failure detection and maintenance section, and the short-circuiting section connected in parallel to at least one light emitting device among the plurality of light emitting devices.

The embodiments of the invention are explained above with reference to the drawings. However, a specific configuration is not limited to the embodiments. The components, the combination of the components, and the like in the embodiments are examples. Addition, omission, replacement, and other changes of the components are possible without departing from the spirit of the invention. The invention is not limited by the embodiments and is limited only by the appended claims.

The entire disclosure of Japanese Patent Application No. 2013-041750, filed Mar. 4, 2013 is expressly incorporated by reference herein.

What is claimed is:

1. A light source device comprising:
a plurality of light emitting devices connected in series; and
a plurality of protection circuits individually connected to each of the plurality of light emitting devices, each protection circuit being connected to a corresponding light emitting device that is one of the plurality of light emitting devices, each protection circuit comprising:
an open-circuit failure detecting section connected in parallel to the corresponding light emitting device, the open-circuit failure detecting section detecting an open-circuit failure of the corresponding light emitting device;
a failure detection and maintenance section connected in parallel to the corresponding light emitting device, the failure detection and maintenance section shifting to and maintaining a circuit state when an open-circuit failure is detected for the corresponding light emitting device; and
a short-circuiting section connected in parallel to the corresponding light emitting device, the short-circuiting section short-circuiting both ends of the corresponding light emitting device when the failure detection and maintenance section maintains the circuit state.

2. The light source device according to claim 1, wherein the short-circuiting section includes an FET, a drain of which is connected to one end of the corresponding light emitting device and a source of which is connected to the other end of the corresponding light emitting device, and the short-circuiting section short-circuits both the ends of the corresponding light emitting device by changing the drain and the source of the FET to a conduction state.

3. The light source device according to claim 2, wherein the failure detection and maintenance section includes a fuse that is fused when the opening-circuit failure detecting section detects the open-circuit failure, and the failure detection and maintenance section maintains the conduction state of the drain and the source of the FET when the fuse is fused.

4. The light source device according to claim 3, wherein the short-circuiting section suppresses a change in gate potential of the FET until the fuse is fused.

5. The light source device according to claim 3, wherein one end of the fuse is connected to a cathode of a light emitting device in a next stage or a stage subsequent to the next stage of a light emitting device to which the failure detection and maintenance section including the fuse is connected in series or an anode of a light emitting device connected to a pre-stage or a stage preceding the pre-stage of the corresponding light emitting device.

6. The light source device according to claim 2, wherein the failure detection and maintenance section includes a capacitor and a plurality of transistors, and when the open-circuit failure detecting section detects the open-circuit failure, the failure detection and maintenance section accumulates charges in the capacitor and fixes a conduction state of the plurality of transistors to maintain the conduction state of the drain and the source of the FET.

7. The light source device according to claim 1, wherein the open-circuit failure detecting section includes a Zener diode having a breakdown voltage higher than a voltage applied to both the ends of the corresponding light emitting device when the corresponding light emitting device is normally operating, and when a voltage equal to or higher than the breakdown voltage is applied to the Zener diode, the failure detection and maintenance section shifts to the circuit state during the open-circuit failure and maintains the circuit state to which the failure detection and maintenance section shifts.

8. A projector comprising:
a plurality of light emitting devices connected in series;
a modulating section configured to modulate light emitted from the plurality of light emitting devices; and
a plurality of protection circuits individually connected to each of the plurality of light emitting devices, each protection circuit being connected to a corresponding light emitting device that is one of the plurality of light emitting devices, each protection circuit comprising:
an open-circuit failure detecting section connected in parallel to the corresponding light emitting device, the open-circuit failure detecting section detecting an open-circuit failure of the corresponding light emitting device;
a failure detection and maintenance section connected in parallel to the corresponding light emitting device, the failure detection and maintenance section shifting to and maintaining a circuit state when an open-circuit failure is detected for the corresponding light emitting device; and
a short-circuiting section connected in parallel to the corresponding light emitting device, the short-circuiting section short-circuiting both ends of the corresponding light emitting device when the failure detection and maintenance section maintains the circuit state.

* * * * *